US011917162B2

(12) United States Patent
Ding et al.

(10) Patent No.: US 11,917,162 B2
(45) Date of Patent: Feb. 27, 2024

(54) CONTENT-ADAPTIVE ONLINE TRAINING WITH FEATURE SUBSTITUTION IN NEURAL IMAGE COMPRESSION

(71) Applicant: Tencent America LLC, Palo Alto, CA (US)

(72) Inventors: Ding Ding, Palo Alto, CA (US); Sheng Lin, Palo Alto, CA (US); Wei Jiang, Sunnyvale, CA (US); Wei Wang, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/730,026

(22) Filed: Apr. 26, 2022

(65) Prior Publication Data

US 2022/0353512 A1 Nov. 3, 2022

Related U.S. Application Data

(60) Provisional application No. 63/182,476, filed on Apr. 30, 2021.

(51) Int. Cl.
*H04N 19/147* (2014.01)
*H04N 19/13* (2014.01)
*H04N 19/149* (2014.01)
*H04N 19/91* (2014.01)

(52) U.S. Cl.
CPC .......... *H04N 19/147* (2014.11); *H04N 19/13* (2014.11); *H04N 19/149* (2014.11); *H04N 19/91* (2014.11)

(58) Field of Classification Search
CPC .... H04N 19/147; H04N 19/13; H04N 19/149; H04N 19/91; H04N 19/90; G06T 9/002
See application file for complete search history.

(56) References Cited

U.S. PATENT DOCUMENTS

| 2012/0033040 A1* | 2/2012 | Pahalawatta ......... H04N 19/156 |
| | | 348/43 |
| 2020/0160565 A1* | 5/2020 | Ma ........................ H04N 19/60 |
| 2022/0103839 A1* | 3/2022 | Van Rozendaal .... H04N 19/184 |

FOREIGN PATENT DOCUMENTS

| EP | 3799431 A1 * | 3/2021 | ........... G06N 3/0454 |
| WO | WO-2020165493 A1 * | 8/2020 | ........... G06N 3/0454 |

* cited by examiner

*Primary Examiner* — Dramos Kalapodas
(74) *Attorney, Agent, or Firm* — ARENTFOX SCHIFF LLP

(57) ABSTRACT

Aspects of the disclosure provide a method and an apparatus for video encoding. The apparatus includes processing circuitry configured to generate an initial feature representation from an input image to be encoded and perform an iterative update of values of a plurality of elements in the initial feature representation. The iterative update includes generate a coded representation corresponding to a final feature representation based on the final feature representation that has been updated from the initial feature representation by a number of iterations of the iterative update. A reconstructed image corresponding to the final feature representation is generated based on the coded representation. An encoded image corresponding to the final feature representation having updated values of the plurality of elements is generated. One of (i) a rate-distortion loss corresponding to the final feature representation or (ii) the number of iterations of the iterative update satisfies a pre-determined condition.

20 Claims, 19 Drawing Sheets

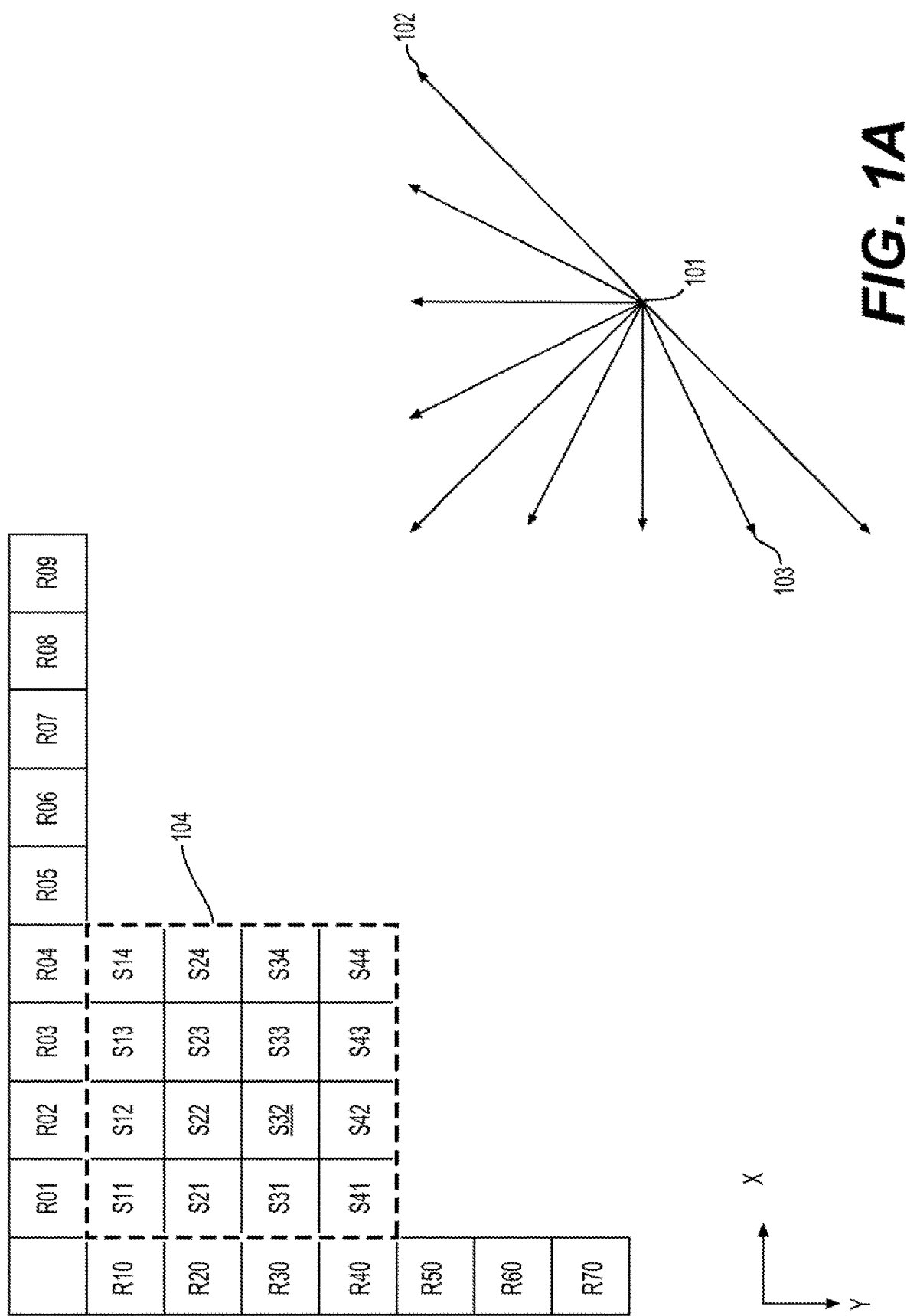

FIG. 10
Main encoder network

Conv: 5x5 c192 s2
GDN
Conv: 5x5 c192 s2
GDN
Conv: 5x5 c192 s2
GDN
Conv: 5x5 c192 s2
GDN

FIG. 11
Main decoder network

DeConv: 5x5 c192 s2
IGDN
DeConv: 5x5 c192 s2
IGDN
DeConv: 5x5 c192 s2
IGDN
DeConv: 5x5 c3 s2
IGDN

FIG. 12
Hyper encoder

Conv: 3x3 c192 s1
Leaky ReLU
Conv: 5x5 c192 s2
Leaky ReLU
Conv: 5x5 c192 s2

FIG. 13
Hyper decoder

DeConv: 5x5 c192 s2
Leaky ReLU
DeConv: 5x5 c288 s2
Leaky ReLU
DeConv: 3x3 c384 s1

FIG. 14
Context model NN

Masked: 5x5 c384 s1

FIG. 15
Entropy parameter NN

Conv: 1x1 c640 s1
Leaky ReLU
Conv: 1x1 c512 s1
Leaky ReLU
Conv: 1x1 c384 s1

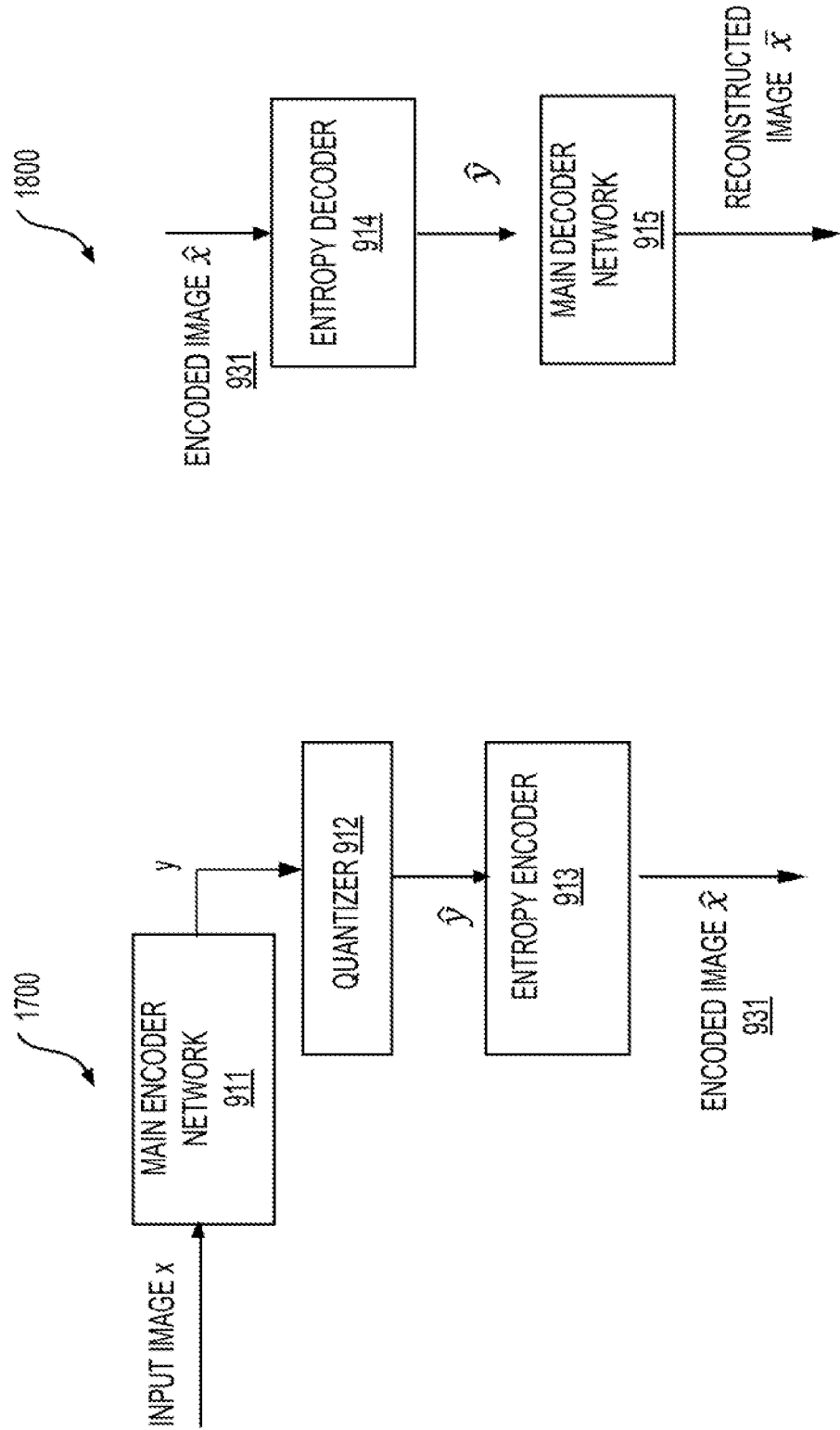

CONTENT-ADAPTIVE ONLINE TRAINING WITH FEATURE SUBSTITUTION IN NEURAL IMAGE COMPRESSION

INCORPORATION BY REFERENCE

This present disclosure claims the benefit of priority to U.S. Provisional Application No. 63/182,476 "Content-adaptive Online Training with Feature Substitution in Neural Image Compression" filed on Apr. 30, 2021, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Image and/or video coding and decoding can be performed using inter-picture prediction with motion compensation. Uncompressed digital image and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as known from, for example MPEG-2 generation coding technologies, does not use intra prediction. However, some newer video compression technologies include techniques that attempt, from, for example, surrounding sample data and/or metadata obtained during the encoding and/or decoding of spatially neighboring, and preceding in decoding order, blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, the technique in use can be coded in an intra prediction mode. In certain cases, modes can have submodes and/or parameters, and those can be coded individually or included in the mode codeword. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values belonging to already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from H.265's 33 possible predictor directions (corresponding to the 33 angular modes of the 35 intra modes). The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore no negative values need to be used.

Intra picture prediction can work by copying reference sample values from the neighboring samples as appropriated by the signaled prediction direction. For example, assume the coded video bitstream includes signaling that, for this block, indicates a prediction direction consistent with arrow (102)—that is, samples are predicted from a prediction sample or samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013), and JEM/VVC/BMS, at the time of disclosure, can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction directions bits in the coded video bitstream that represent the direction can be different from video coding technology to video coding technology; and can range, for example, from simple direct mappings of prediction direction to intra prediction mode, to codewords, to complex adaptive schemes involving most probable modes, and similar techniques. In all cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video encoding includes processing circuitry. The processing circuitry is configured to generate an initial feature representation from an input image to be encoded. The processing circuitry is configured to perform an iterative update of values of a plurality of elements in the initial feature representation. The iterative update includes generating a coded representation corresponding to a final feature representation based on the final feature representation that has been updated from the initial feature representation by a number of iterations of the iterative update. The iterative update includes generating a reconstructed image corresponding to the final feature representation based on the coded representation. The processing circuitry is configured to generate an encoded image corresponding to the final feature representation having updated values of the plurality of elements. One of (i) a rate-distortion loss corresponding to the final feature representation or (ii) the number of iterations of the iterative update satisfies a pre-determined condition where the rate-distortion loss is determined based on a bit consumption of the coded representation corresponding to the final feature representation and a difference between the input image and the reconstructed image corresponding to the final feature representation.

In an embodiment, the processing circuitry is configured to add noise to the final feature representation to generate a first representation corresponding to the final feature representation and generate the coded representation based on a simulated entropy encoding of the first representation. The processing circuitry is configured to perform a simulated entropy decoding of the coded representation.

In an embodiment, the processing circuitry is configured to determine a context model based on the final feature representation, and generate the coded representation based on the simulated entropy encoding of the first representation with the determined context model.

In an example, the processing circuitry is configured to quantize the final feature representation into a quantized representation where the encoded image is generated based on the quantized representation.

In an example, the processing circuitry is configured to entropy encode the quantized representation into the encoded image. In an example, the processing circuitry is configured to arithmetic encode the quantized representation into the encoded image.

In an example, the processing circuitry is configured to determine a context model based on the final feature representation, and entropy encode, based on the determined context model, the quantized representation into the encoded image.

In an embodiment, the processing circuitry is configured to perform the iterative update of (i) the values of the plurality of elements in the initial feature representation and (ii) a pretrained parameter in a neural network (NN) used to generate the coded representation based on the final feature representation. The processing circuitry can generate the coded representation corresponding to the final feature representation based on the final feature representation by the NN updated with a replacement parameter that replaces the pretrained parameter. The replacement parameter has been determined from the pretrained parameter by the number of iterations of the iterative update. The processing circuitry can generate, based on the NN updated by the replacement parameter, the encoded image from the final feature representation.

In an embodiment, the processing circuitry is configured to perform the iterative update of (i) the values of the plurality of elements in the initial feature representation and (ii) a pretrained parameter in a neural network (NN) used to generate the reconstructed image based on the coded representation. The processing circuitry can generate the reconstructed image corresponding to the final feature representation based on the coded representation corresponding to the final feature representation by the NN updated with a replacement parameter that replaces the pretrained parameter. The replacement parameter has been determined from the pretrained parameter by the number of iterations of the iterative update. The processing circuitry can generate neural network update information that is included in a coded bitstream where the neural network update information indicates the replacement parameter. The processing circuitry can transmit the encoded image and the neural network update information in the coded bitstream.

In an example, the processing circuitry transmits the encoded image in a coded bitstream.

Aspects of the disclosure also provide a non-transitory computer-readable storage medium storing a program executable by at least one processor to perform the methods for video encoding and decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIG. 10 shows an exemplary convolution neural network (CNN) of a main encoder network according to an embodiment of the disclosure.

FIG. 11 shows an exemplary CNN of a main decoder network according to an embodiment of the disclosure.

FIG. 12 shows an exemplary CNN of a hyper encoder according to an embodiment of the disclosure.

FIG. 13 shows an exemplary CNN of a hyper decoder according to an embodiment of the disclosure.

FIG. 14 shows an exemplary CNN of a context model network according to an embodiment of the disclosure.

FIG. 15 shows an exemplary CNN of an entropy parameter network according to an embodiment of the disclosure.

FIG. 17 shows an exemplary video encoder according to an embodiment of the disclosure.

FIG. 18 shows an exemplary video decoder according to an embodiment of the disclosure.

DETAILED DESCRIPTION OF EMBODIMENTS

Figure 1B:
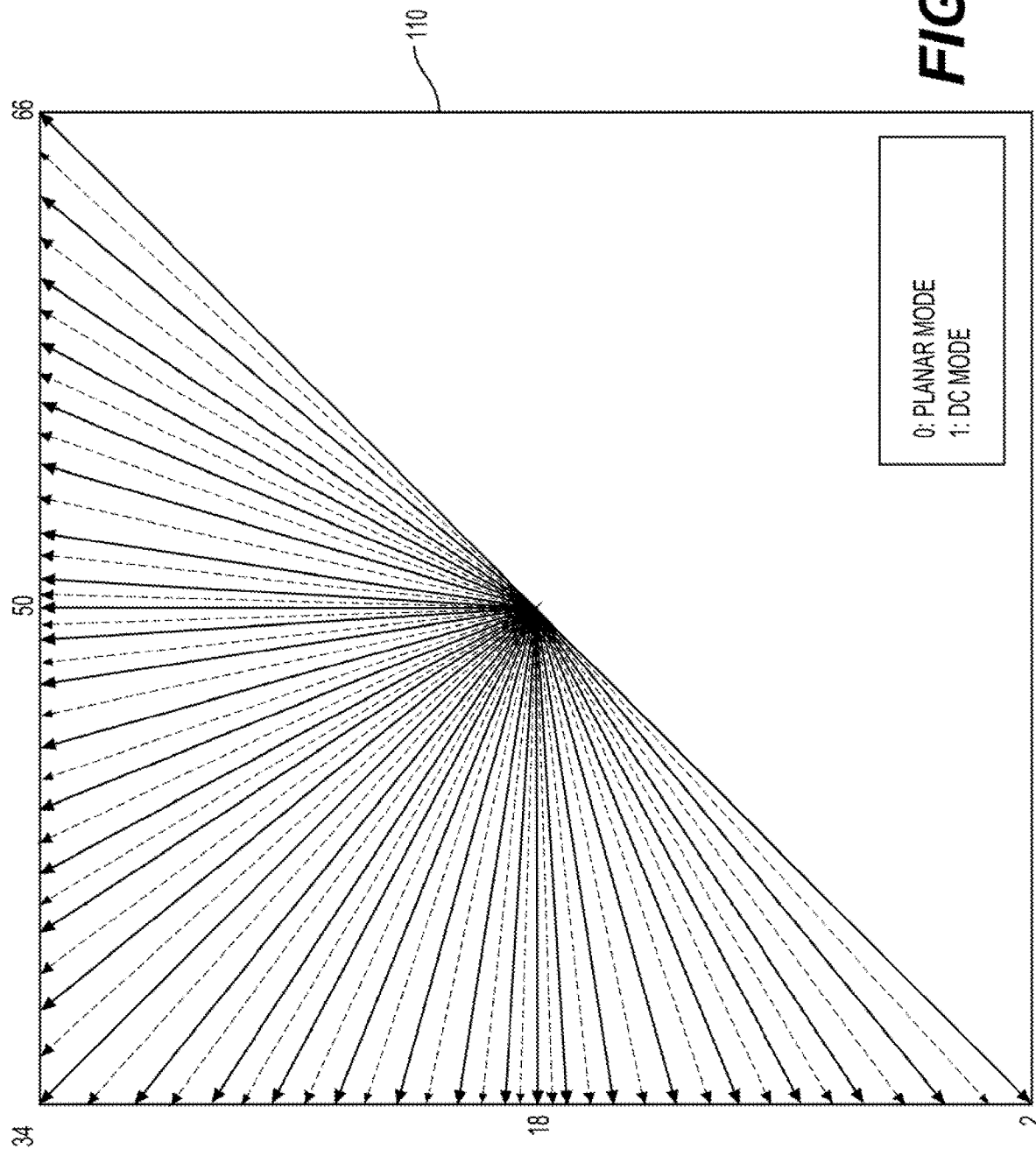
FIG. 1B is an illustration of exemplary intra prediction directions.
Figure 2:
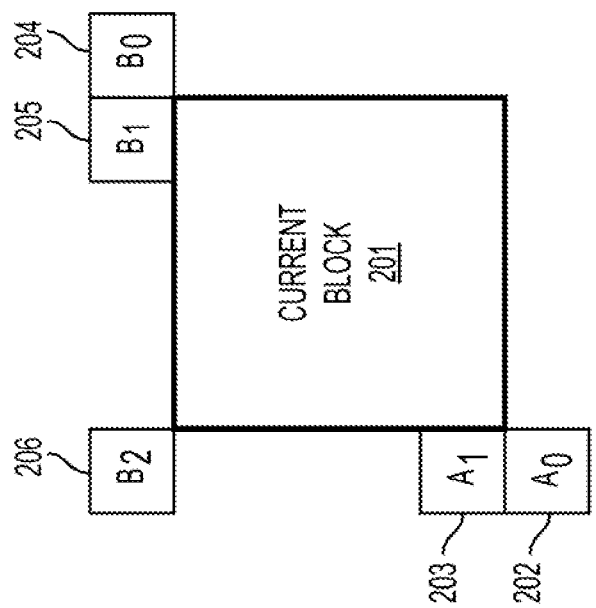
FIG. 2 shows a current block (201) and surrounding samples in accordance with an embodiment.
Figure 3:
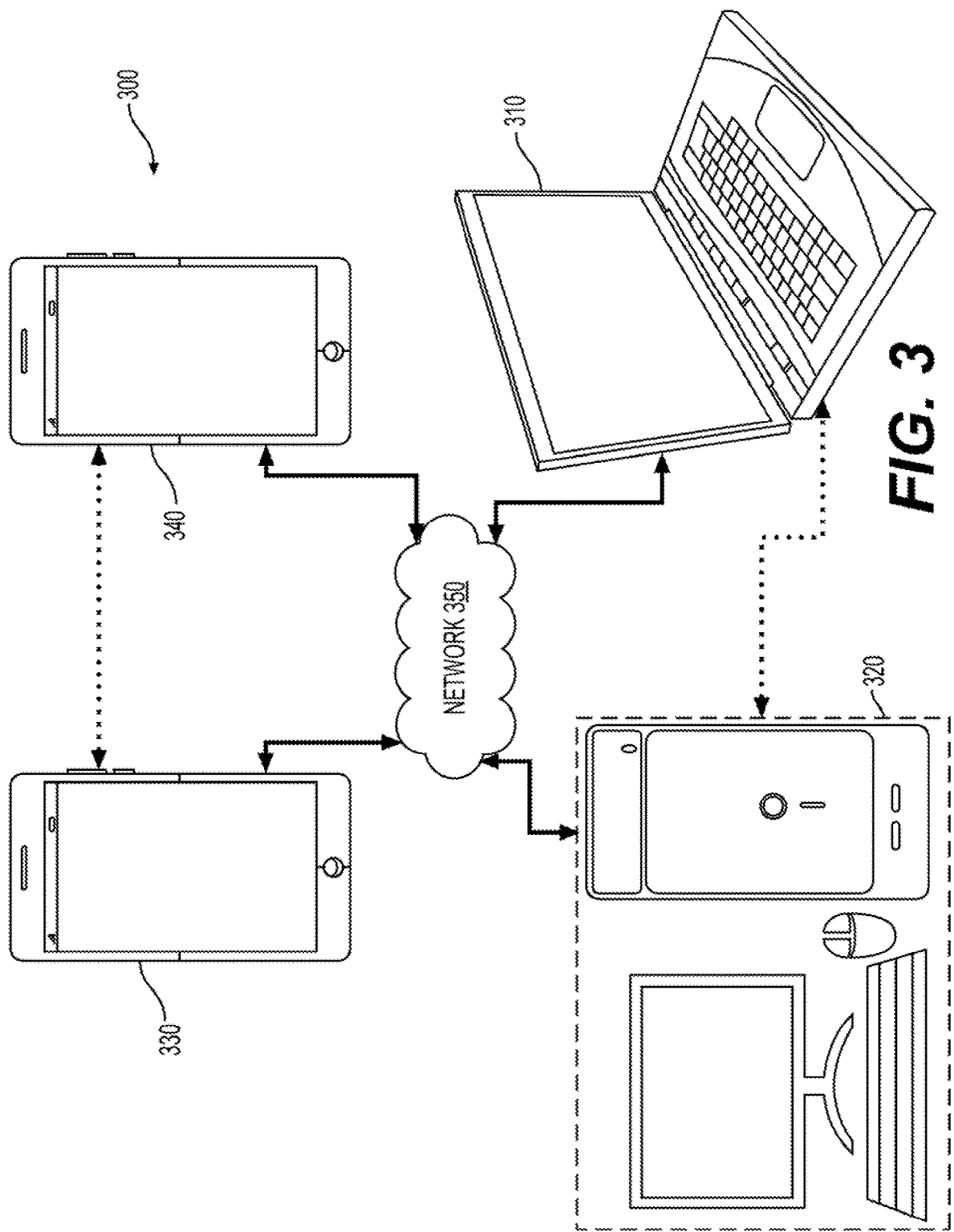
FIG. 3 is a schematic illustration of a simplified block diagram of a communication system (300) in accordance with an embodiment.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that performs bidirectional transmission of coded video data that may occur, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the FIG. 3 example, the terminal devices (310), (320), (330) and (340) may be illustrated as servers, personal computers and smart phones but the principles of the present disclosure may be not so limited. Embodiments of the present disclosure find application with laptop computers, tablet computers, media players and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
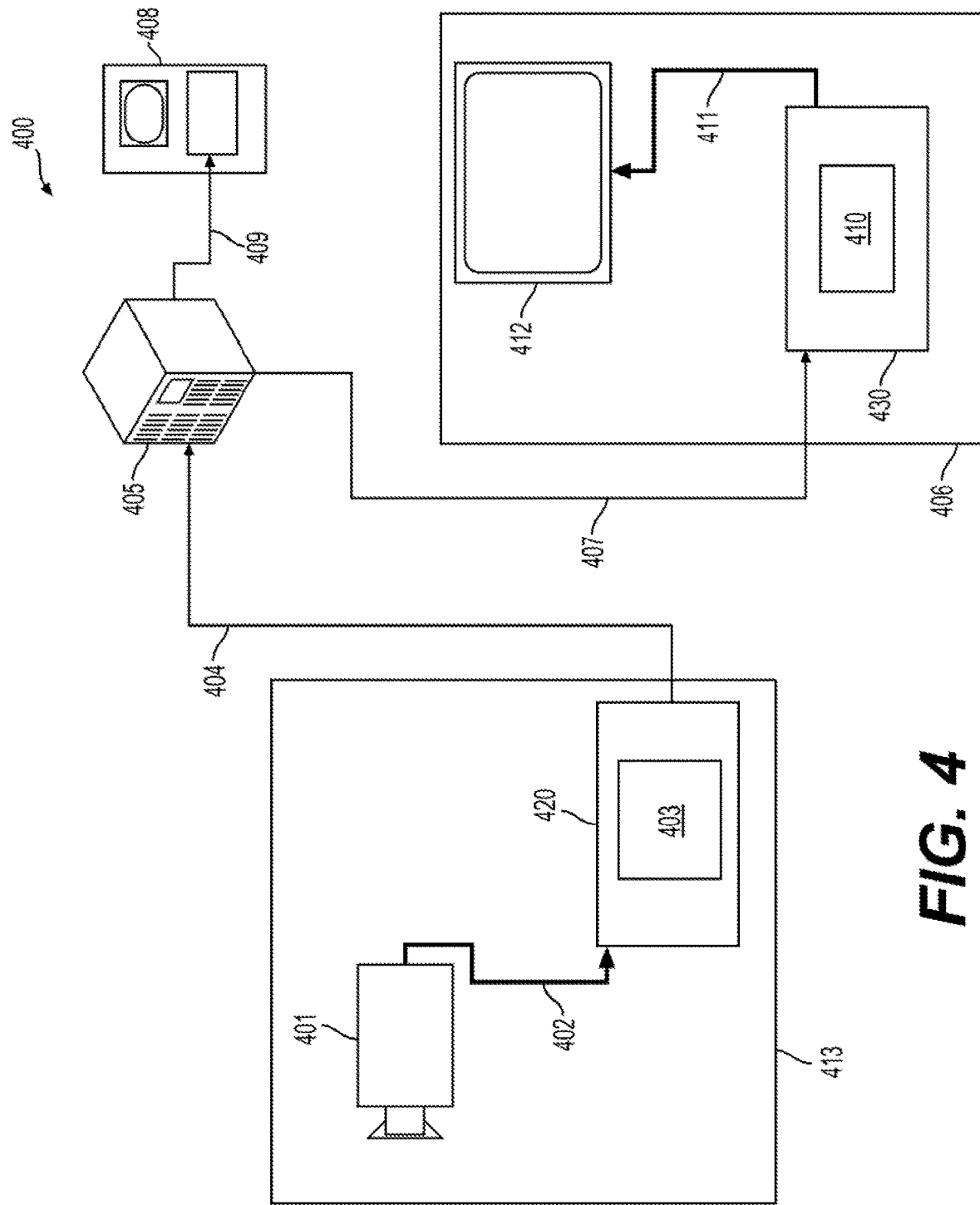
FIG. 4 is a schematic illustration of a simplified block diagram of a communication system (400) in accordance with an embodiment.

FIG. 4 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
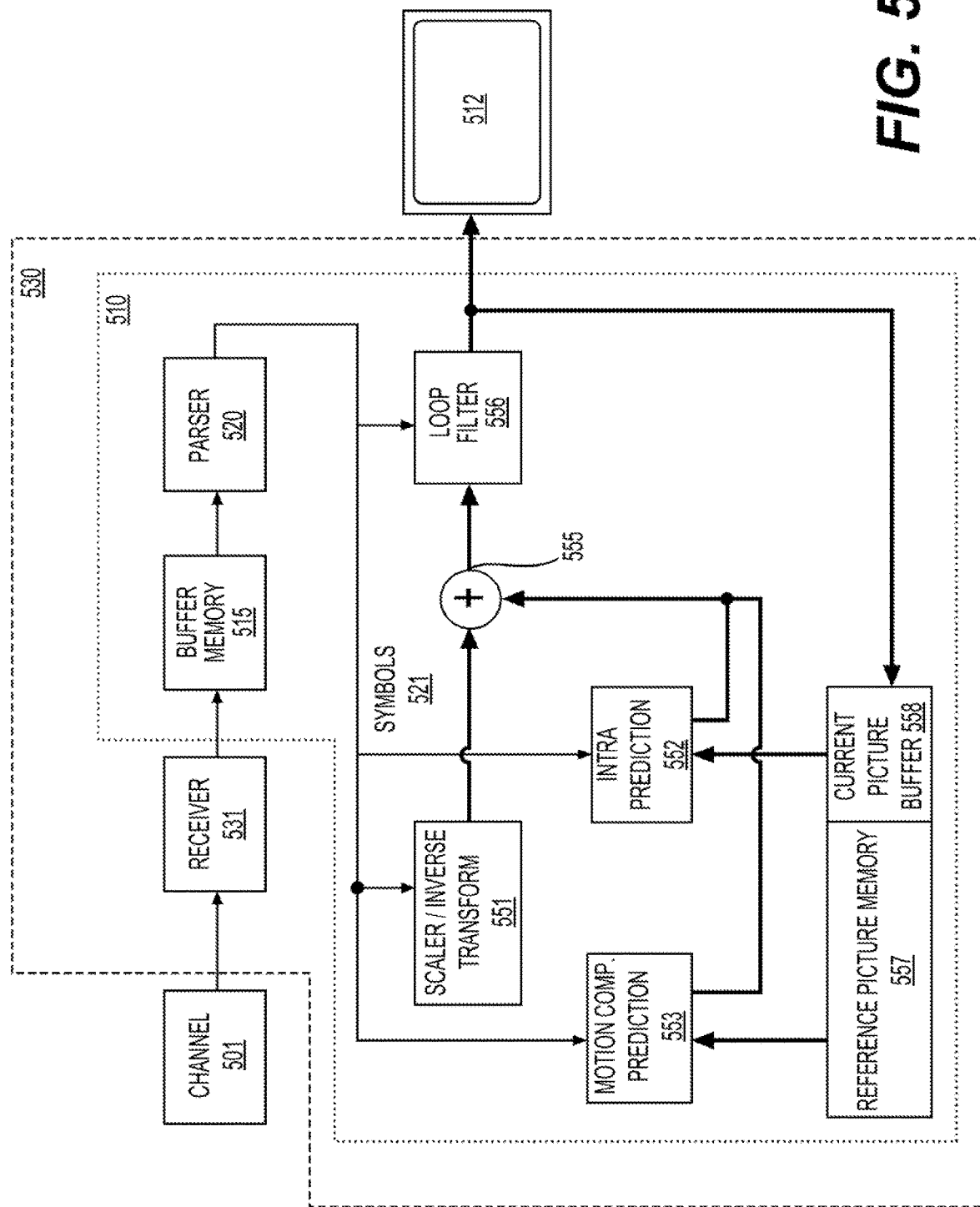
FIG. 5 is a schematic illustration of a simplified block diagram of a decoder in accordance with an embodiment.

FIG. 5 shows a block diagram of a video decoder (510) according to an embodiment of the present disclosure. The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510); in the same or another embodiment, one coded video sequence at a time, where the decoding of each coded video sequence is independent from other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as was shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform (551) can pertain to an intra coded block; that is: a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
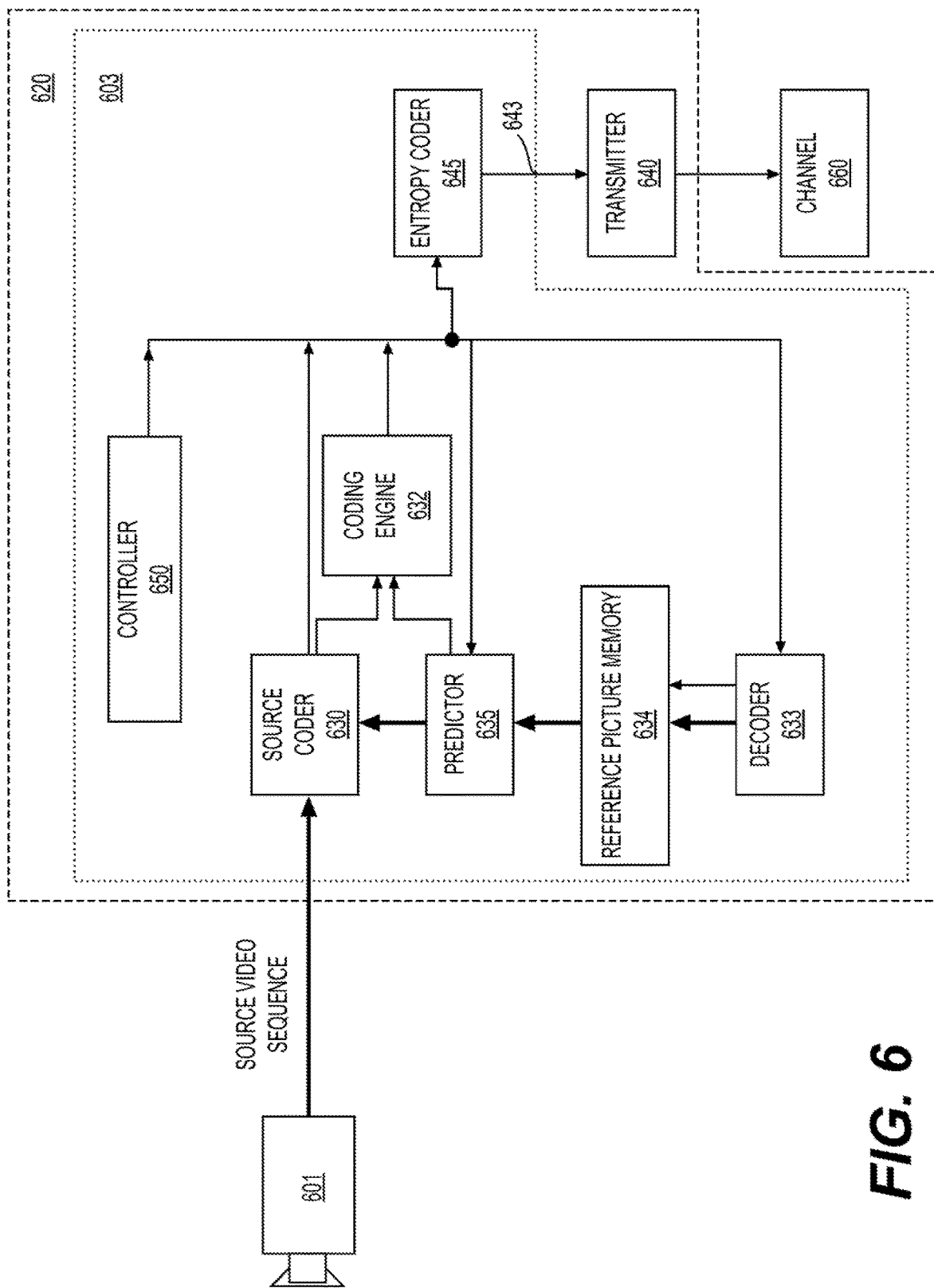
FIG. 6 is a schematic illustration of a simplified block diagram of an encoder in accordance with an embodiment.

FIG. 6 shows a block diagram of a video encoder (603) according to an embodiment of the present disclosure. The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required by the application. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compressing the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
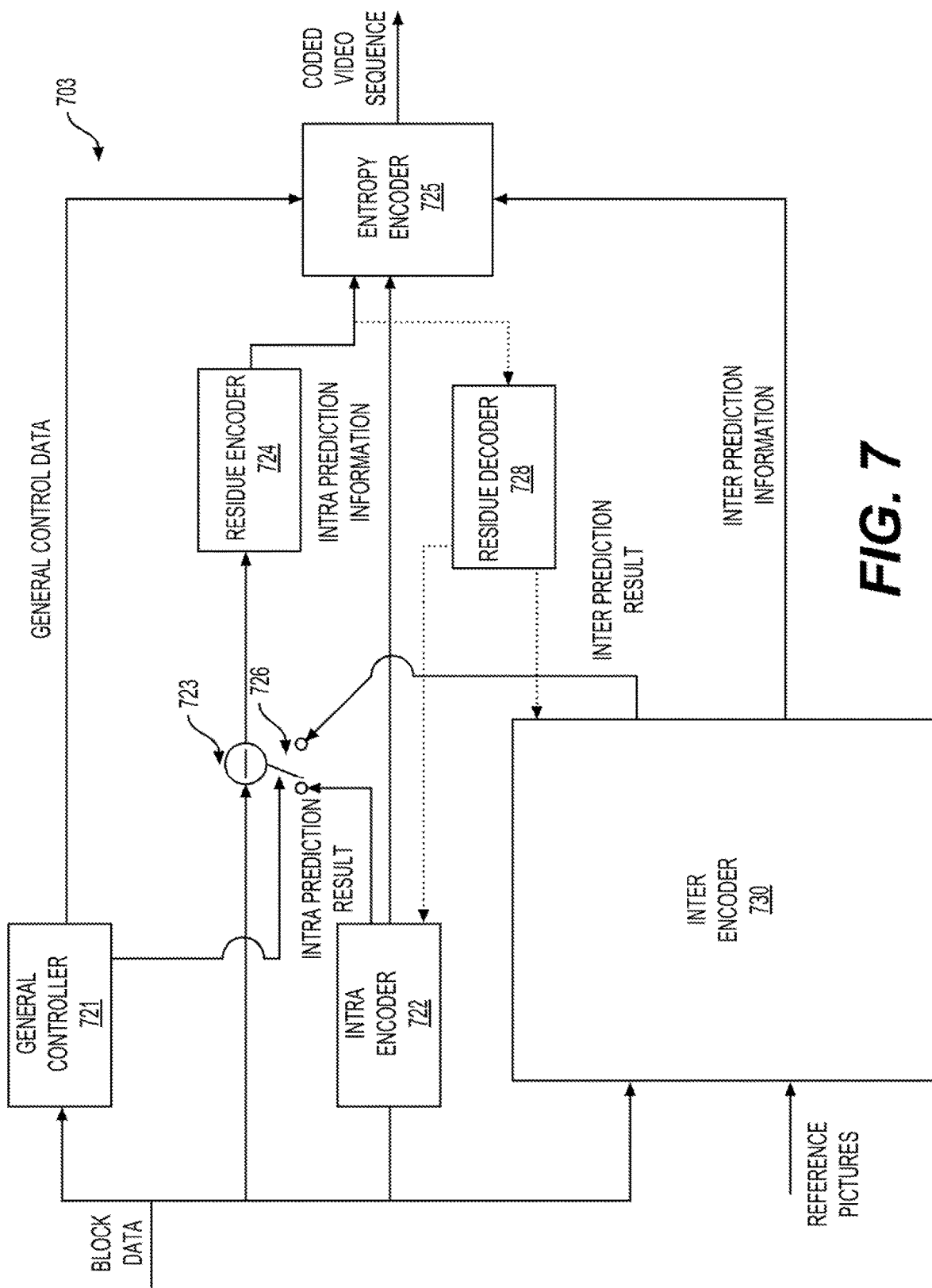
FIG. 7 shows a block diagram of an encoder in accordance with another embodiment.

FIG. 7 shows a diagram of a video encoder (703) according to another embodiment of the disclosure. The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes the inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
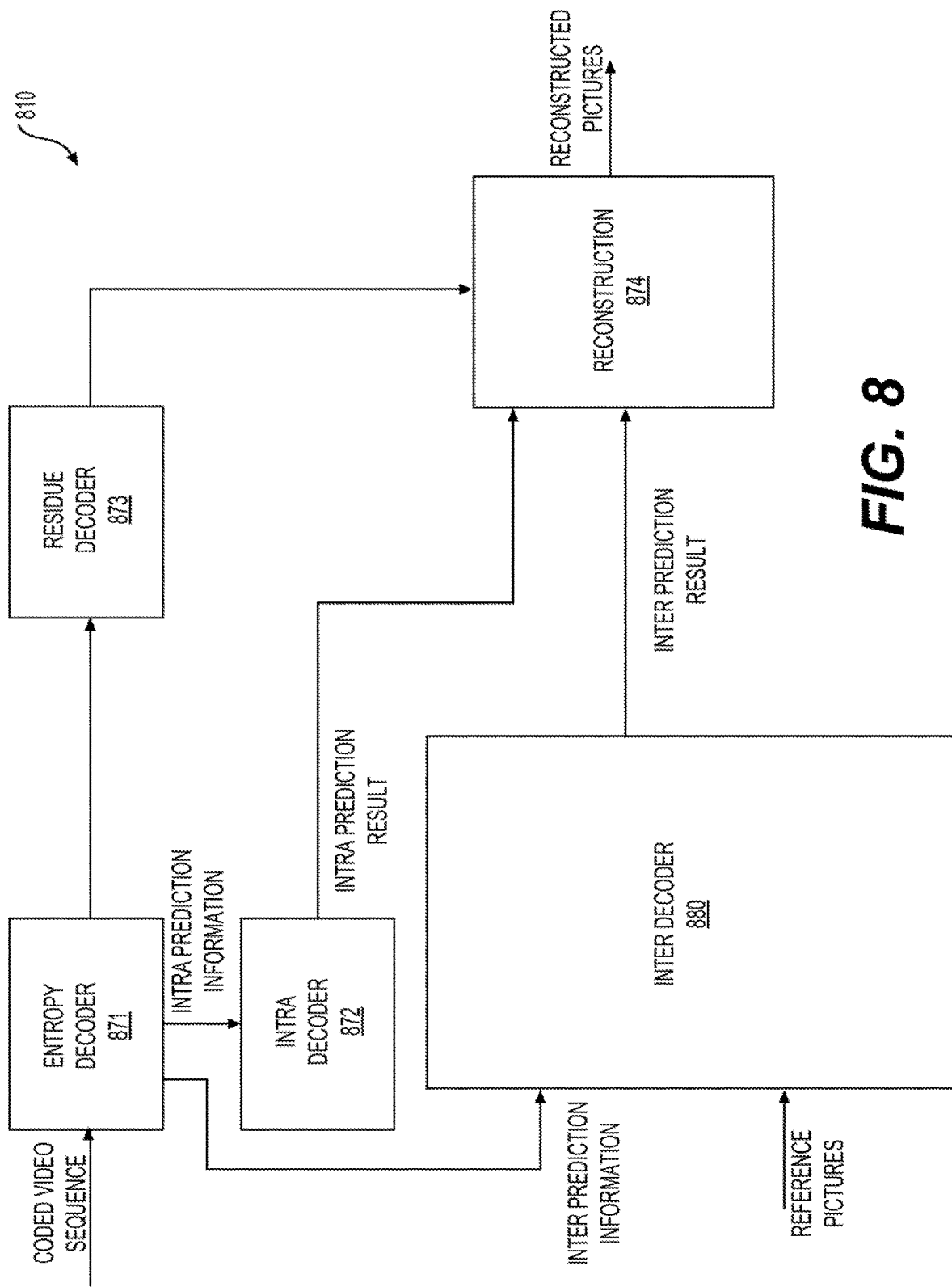
FIG. 8 shows a block diagram of a decoder in accordance with another embodiment.

FIG. 8 shows a diagram of a video decoder (810) according to another embodiment of the disclosure. The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (872) or the inter decoder (880), respectively, residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

This disclosure describes video coding technologies related to neural image compression technologies and/or neural video compression technologies, such as artificial intelligence (AI) based neural image compression (NIC). Aspects of the disclosure include content-adaptive online training in NIC, such as NIC methods for an end-to-end (E2E) optimized image coding framework based on neural networks. A neural network (NN) can include an artificial neural network (ANN), such as a deep neural network (DNN), a convolution neural network (CNN), or the like.

In an embodiment, a related hybrid video codec is difficult to be optimized as a whole. For example, an improvement of a single module (e.g., an encoder) in the hybrid video codec may not result in a coding gain in the overall performance. In a NN-based video coding framework, different modules can be jointly optimized from an input to an output to improve a final objective (e.g., rate-distortion performance, such as a rate-distortion loss L described in the disclosure) by performing a learning process or a training process (e.g., a machine learning process), and thus resulting in an E2E optimized NIC.

An exemplary NIC framework or system can be described as follows. The NIC framework can use an input image x as an input to a neural network encoder (e.g., an encoder based on neural networks such as DNNs) to compute a compressed representation (e.g., a compact representation) $\hat{x}$ that can be compact, for example, for storage and transmission purposes. A neural network decoder (e.g., a decoder based on neural networks such as DNNs) can use the compressed representation $\hat{x}$ as an input to reconstruct an output image (also referred to as a reconstructed image) $\bar{x}$. In various embodiments, the input image x and reconstructed image $\bar{x}$ are in a spatial domain and the compressed representation $\hat{x}$ is in a domain different from the spatial domain. In some examples, the compressed representation $\hat{x}$ is quantized and entropy coded.

In some examples, a NIC framework can use a variational autoencoder (VAE) structure. In the VAE structure, the neural network encoder can directly use the entire input image x as the input to the neural network encoder. The entire input image x can pass through a set of neural network layers that work as a black box to compute the compressed representation $\hat{x}$. The compressed representation $\hat{x}$ is an output of the neural network encoder. The neural network decoder can take the entire compressed representation $\hat{x}$ as an input. The compressed representation $\hat{x}$ can pass through another set of neural network layers that work as another black box to compute the reconstructed image $\bar{x}$. A rate-distortion (R-D) loss L (x, $\bar{x}$, $\hat{x}$) can be optimized to achieve a trade-off between a distortion loss D (x, $\bar{x}$) of the reconstructed image $\bar{x}$ and bit consumption R of the compact representation $\hat{x}$ with a trade-off hyperparameter λ.

$$L(x,\bar{x},\hat{x})=\lambda D(x,\bar{x})+R(\hat{x}) \qquad \text{Eq. 1}$$

A neural network (e.g., an ANN) can learn to perform tasks from examples, without task-specific programming. An ANN can be configured with connected nodes or artificial neurons. A connection between nodes can transmit a signal from a first node to a second node (e.g., a receiving node), and the signal can be modified by a weight which can be indicated by a weight coefficient for the connection. The receiving node can process signal(s) (i.e., input signal(s) for the receiving node) from node(s) that transmit the signal(s) to the receiving node and then generate an output signal by applying a function to the input signals. The function can be a linear function. In an example, the output signal is a weighted summation of the input signal(s). In an example, the output signal is further modified by a bias which can be indicated by a bias term, and thus the output signal is a sum of the bias and the weighted summation of the input signal(s). The function can include a nonlinear operation, for example, on the weighted sum or the sum of the bias and the weighted summation of the input signal(s). The output signal can be sent to node(s) (downstream node(s)) connected to the receiving node). The ANN can be represented or configured by parameters (e.g., weights of the connections and/or biases). The weights and/or the biases can be obtained by training the ANN with examples where the weights and/or the biases can be iteratively adjusted. The trained ANN configured with the determined weights and/or the determined biases can be used to perform tasks.

Nodes in an ANN can be organized in any suitable architecture. In various embodiments, nodes in an ANN are organized in layers including an input layer that receives input signal(s) to the ANN and an output layer that outputs output signal(s) from the ANN. In an embodiment, the ANN further includes layer(s) such as hidden layer(s) between the input layer and the output layer. Different layers may perform different kinds of transformations on respective inputs of the different layers. Signals can travel from the input layer to the output layer.

An ANN with multiple layers between an input layer and an output layer can be referred to as a DNN. In an embodiment, a DNN is a feedforward network where data flows from the input layer to the output layer without looping back. In an example, a DNN is a fully connected network where each node in one layer is connected to all nodes in the next layer. In an embodiment, a DNN is a recurrent neural network (RNN) where data can flow in any direction. In an embodiment, a DNN is a CNN.

A CNN can include an input layer, an output layer, and hidden layer(s) between the input layer and the output layer. The hidden layer(s) can include convolutional layer(s) (e.g., used in an encoder) that perform convolutions, such as a two-dimensional (2D) convolution. In an embodiment, a 2D convolution performed in a convolution layer is between a convolution kernel (also referred to as a filter or a channel, such as a 5×5 matrix) and an input signal (e.g., a 2D matrix such as a 2D image, a 256×256 matrix) to the convolution layer. In various examples, a dimension of the convolution kernel (e.g., 5×5) is smaller than a dimension of the input signal (e.g., 256×256). Thus, a portion (e.g., a 5×5 area) in the input signal (e.g., a 256×256 matrix) that is covered by the convolution kernel is smaller than an area (e.g., a 256×256 area) of the input signal, and thus can be referred to as a receptive field in the respective node in the next layer.

During the convolution, a dot product of the convolution kernel and the corresponding receptive field in the input signal is calculated. Thus, each element of the convolution kernel is a weight that is applied to a corresponding sample in the receptive field, and thus the convolution kernel includes weights. For example, a convolution kernel represented by a 5×5 matrix has 25 weights. In some examples, a bias is applied to the output signal of the convolution layer, and the output signal is based on a sum of the dot product and the bias.

The convolution kernel can shift along the input signal (e.g., a 2D matrix) by a size referred to as a stride, and thus the convolution operation generates a feature map or an activation map (e.g., another 2D matrix), which in turn contributes to an input of the next layer in the CNN. For example, the input signal is a 2D image having 256×256 samples, a stride is 2 samples (e.g., a stride of 2). For the stride of 2, the convolution kernel shifts along an X direction (e.g., a horizontal direction) and/or a Y direction (e.g., a vertical direction) by 2 samples.

Multiple convolution kernels can be applied in the same convolution layer to the input signal to generate multiple feature maps, respectively, where each feature map can represent a specific feature of the input signal. In general, a convolution layer with N channels (i.e., N convolution kernels), each convolution kernel having M×M samples, and a stride S can be specified as Cony: M×M cN sS. For example, a convolution layer with 192 channels, each convolution kernel having 5×5 samples, and a stride of 2 is specified as Cony: 5×5 c192 s2. The hidden layer(s) can include deconvolutional layer(s) (e.g., used in a decoder) that perform deconvolutions, such as a 2D deconvolution. A deconvolution is an inverse of a convolution. A deconvolution layer with 192 channels, each deconvolution kernel having 5×5 samples, and a stride of 2 is specified as DeConv: 5×5 c192 s2.

In various embodiments, a CNN has the following benefits. A number of learnable parameters (i.e., parameters to be trained) in a CNN can be significantly smaller than a number of learnable parameters in a DNN, such as a feedforward DNN. In the CNN, a relatively large number of nodes can share a same filter (e.g., same weights) and a same bias (if the bias is used), and thus the memory footprint can be reduced because a single bias and a single vector of weights can be used across all receptive fields that share the same filter. For example, for an input signal having 100×100 samples, a convolution layer with a convolution kernel having 5×5 samples has 25 learnable parameters (e.g., weights). If a bias is used, then one channel uses 26 learnable parameters (e.g., 25 weights and one bias). If the convolution layer has N channels, the total learnable parameters is 26×N. On the other hand, for a fully connected a layer in a DNN, 100×100 (i.e., 10000) weights are used for each node in the next layer. If the next layer has L nodes, then the total learnable parameters is 10000×L.

A CNN can further include one or more other layer(s), such as pooling layer(s), fully connected layer(s) that can connect every node in one layer to every node in another layer, normalization layer(s), and/or the like. Layers in a CNN can be arranged in any suitable order and in any suitable architecture (e.g., a feed-forward architecture, a recurrent architecture). In an example, a convolutional layer is followed by other layer(s), such as pooling layer(s), fully connected layer(s), normalization layer(s), and/or the like.

A pooling layer can be used to reduce dimensions of data by combining outputs from a plurality of nodes at one layer into a single node in the next layer. A pooling operation for a pooling layer having a feature map as an input is described below. The description can be suitably adapted to other input signals. The feature map can be divided into sub-regions (e.g., rectangular sub-regions), and features in the respective sub-regions can be independently down-sampled (or pooled) to a single value, for example, by taking an average value in an average pooling or a maximum value in a max pooling.

The pooling layer can perform a pooling, such as a local pooling, a global pooling, a max pooling, an average pooling, and/or the like. A pooling is a form of nonlinear down-sampling. A local pooling combines a small number of nodes (e.g., a local cluster of nodes, such as 2×2 nodes) in the feature map. A global pooling can combine all nodes, for example, of the feature map.

The pooling layer can reduce a size of the representation, and thus reducing a number of parameters, a memory footprint, and an amount of computation in a CNN. In an example, a pooling layer is inserted between successive convolutional layers in a CNN. In an example, a pooling layer is followed by an activation function, such as a rectified linear unit (ReLU) layer. In an example, a pooling layer is omitted between successive convolutional layers in a CNN.

A normalization layer can be an ReLU, a leaky ReLU, a generalized divisive normalization (GDN), an inverse GDN (IGDN), or the like. An ReLU can apply a non-saturating activation function to remove negative values from an input signal, such as a feature map, by setting the negative values to zero. A leaky ReLU can have a small slope (e.g., 0.01) for negative values instead of a flat slope (e.g., 0). Accordingly, if a value x is larger than 0, then an output from the leaky ReLU is x. Otherwise, the output from the leaky ReLU is the value x multiplied by the small slope (e.g., 0.01). In an example, the slope is determined before training, and thus is not learnt during training.

Figure 9:
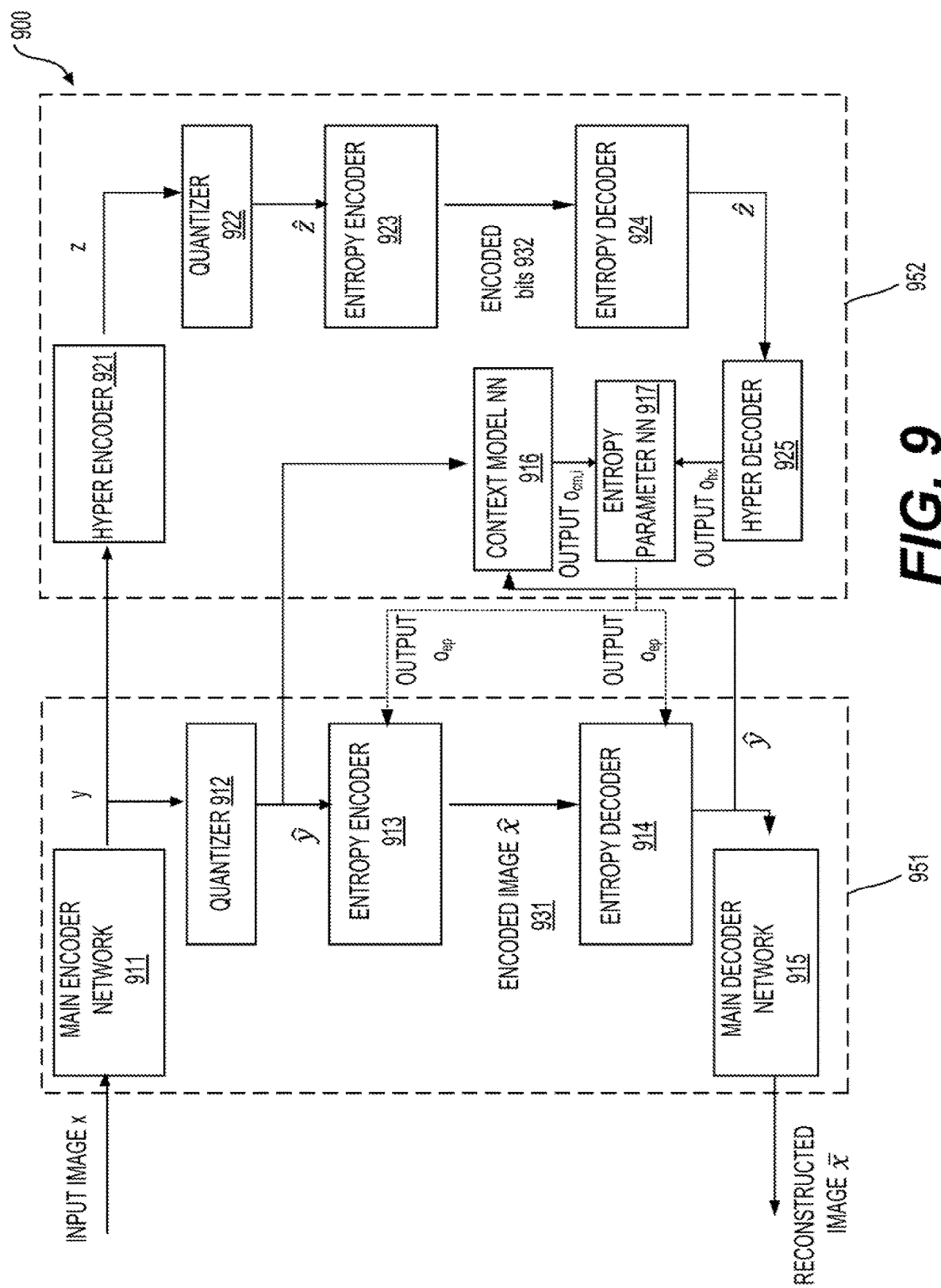
FIG. 9 shows an exemplary neural image compression (NIC) framework according to an embodiment of the disclosure.

FIG. 9 shows an exemplary NIC framework (900) (e.g., a NIC system) according to an embodiment of the disclosure. The NIC framework (900) can be based on neural networks, such as DNNs and/or CNNs. The NIC framework (900) can be used to compress (e.g., encode) images and decompress (e.g., decode or reconstruct) compressed images (e.g., encoded images). The NIC framework (900) can include two sub-neural networks, a first sub-NN (951) and a second sub-NN (952) that are implemented using neural networks.

The first sub-NN (951) can resemble an autoencoder and can be trained to generate a compressed image $\hat{x}$ of an input image x and decompress the compressed image $\hat{x}$ to obtain a reconstructed image $\bar{x}$. The first sub-NN (951) can include a plurality of components (or modules), such as a main encoder neural network (or a main encoder network) (911), a quantizer (912), an entropy encoder (913), an entropy decoder (914), and a main decoder neural network (or a main encoder network) (915). Referring to FIG. 9, the main encoder network (911) can generate a latent or a latent representation y from the input image x (e.g., an image to be compressed or encoded). In an example, the main encoder network (911) is implemented using a CNN. A relationship between the latent representation y and the input image x can be described using Eq. 2.

$$y = f_1(x; \theta_1) \qquad \text{Eq. 2}$$

where a parameter $\theta_1$ represents parameters, such as weights used in convolution kernels in the main encoder network (911) and biases (if biases are used in the main encoder network (911)).

The latent representation y can be quantized using the quantizer (912) to generate a quantized latent $\hat{y}$. The quantized latent $\hat{y}$ can be compressed, for example, using lossless compression by the entropy encoder (913) to generate the compressed image (e.g., an encoded image) $\hat{x}$ (931) that is a compressed representation $\hat{x}$ of the input image x. The entropy encoder (913) can use entropy coding techniques such as Huffman coding, arithmetic coding, or the like. In an example, the entropy encoder (913) uses arithmetic encoding and is an arithmetic encoder. In an example, the encoded image (931) is transmitted in a coded bitstream.

The encoded image (931) can be decompressed (e.g., entropy decoded) by the entropy decoder (914) to generate an output. The entropy decoder (914) can use entropy coding techniques such as Huffman coding, arithmetic coding, or the like that correspond to the entropy encoding techniques used in the entropy encoder (913). In an example, the entropy decoder (914) uses arithmetic decoding and is an arithmetic decoder. In an example, lossless compression is used in the entropy encoder (913), lossless decompression is used in the entropy decoder (914), and noises, such as due to the transmission of the encoded image (931) are omissible, the output from the entropy decoder (914) is the quantized latent $\hat{y}$.

The main decoder network (915) can decode the quantized latent $\hat{y}$ to generate the reconstructed image $\bar{x}$. In an example, the main decoder network (915) is implemented using a CNN. A relationship between the reconstructed image $\bar{x}$ (i.e., the output of the main decoder network (915)) and the quantized latent $\hat{y}$ (i.e., the input of the main decoder network (915)) can be described using Eq. 3.

$$\bar{x} = f_2(\hat{y}; \theta_2) \qquad \text{Eq. 3}$$

where a parameter $\theta_2$ represents parameters, such as weights used in convolution kernels in the main decoder network (915) and biases (if biases are used in the main decoder network (915)). Thus, the first sub-NN (951) can compress (e.g., encode) the input image x to obtain the encoded image (931) and decompress (e.g., decode) the encoded image (931) to obtain the reconstructed image $\bar{x}$. The reconstructed image $\bar{x}$ can be different from the input image x due to quantization loss introduced by the quantizer (912).

The second sub-NN (952) can learn the entropy model (e.g., a prior probabilistic model) over the quantized latent $\hat{y}$ used for entropy coding. Thus, the entropy model can be a conditioned entropy model, e.g., a Gaussian mixture model (GMM), a Gaussian scale model (GSM) that is dependent on the input image x. The second sub-NN (952) can include a context model NN (916), an entropy parameter NN (917), a hyper encoder (921), a quantizer (922), an entropy encoder (923), an entropy decoder (924), and a hyper decoder (925). The entropy model used in the context model NN (916) can be an autoregressive model over latent (e.g., the quantized latent 9). In an example, the hyper encoder (921), the quantizer (922), the entropy encoder (923), the entropy decoder (924), and the hyper decoder (925) form a hyper neural network (e.g., a hyperprior NN). The hyper neural network can represent information useful for correcting context-based predictions. Data from the context model NN (916) and the hyper neural network can be combined by the entropy parameter NN (917). The entropy parameter NN (917) can generate parameters, such as mean and scale parameters for the entropy model such as a conditional Gaussian entropy model (e.g., the GMM).

Referring to FIG. 9, at an encoder side, the quantized latent 9 from the quantizer (912) is fed into the context model NN (916). At a decoder side, the quantized latent 9 from the entropy decoder (914) is fed into the context model NN (916). The context model NN (916) can be implemented using a neural network, such as a CNN. The context model NN (916) can generate an output $o_{cm,i}$ based on a context $\hat{y}_{<i}$ that is the quantized latent $\hat{y}$ available to the context model NN (916). The context $\hat{y}_{<i}$ can include previously quantized latent at the encoder side or previously entropy decoded quantized latent at the decoder side. A relationship between the output $o_{cm,i}$ and the input (e.g., $\hat{y}_{<i}$) of the context model NN (916) can be described using Eq. 4.

$$o_{cm,i} = f_3(\hat{y}_{<i}; \theta_3) \qquad \text{Eq. 4}$$

where a parameter $\theta_3$ represents parameters, such as weights used in convolution kernels in the context model NN (916) and biases (if biases are used in the context model NN (916)).

The output $o_{cm,i}$ from the context model NN (916) and an output $o_{hc}$ from the hyper decoder (925) are fed into the entropy parameter NN (917) to generate an output $o_{ep}$. The entropy parameter NN (917) can be implemented using a neural network, such as a CNN. A relationship between the output $o_{ep}$ and the inputs (e.g., $o_{cm,i}$ and $o_{hc}$) of the entropy parameter NN (917) can be described using Eq. 5.

$$o_{ep} = f_4(o_{cm,i}, o_{hc}; \theta_4) \qquad \text{Eq. 5}$$

where a parameter $\theta_4$ represents parameters, such as weights used in convolution kernels in the entropy parameter NN (917) and biases (if biases are used in the entropy parameter NN (917)). The output $o_{ep}$ of the entropy parameter NN (917) can be used in determining (e.g., conditioning) the entropy model, and thus the conditioned entropy model can be dependent on the input image x, for example, via the output $o_{hc}$ from the hyper decoder (925). In an example, the output $o_{ep}$ includes parameters, such as the mean and scale parameters, used to condition the entropy model (e.g., GMM). Referring to FIG. 9, the entropy model (e.g., the conditioned entropy model) can be employed by the entropy encoder (913) and the entropy decoder (914) in entropy coding and entropy decoding, respectively.

The second sub-NN (952) can be described below. The latent y can be fed into the hyper encoder (921) to generate a hyper latent z. In an example, the hyper encoder (921) is implemented using a neural network, such as a CNN. A relationship between the hyper latent z and the latent y can be described using Eq. 6.

$$z = F_5(y; \theta_5) \quad \text{Eq. 6}$$

where a parameter $\theta_5$ represents parameters, such as weights used in convolution kernels in the hyper encoder (921) and biases (if biases are used in the hyper encoder (921)).

The hyper latent z is quantized by the quantizer (922) to generate a quantized latent $\hat{z}$. The quantized latent $\hat{z}$ can be compressed, for example, using lossless compression by the entropy encoder (923) to generate side information, such as encoded bits (932) from the hyper neural network. The entropy encoder (923) can use entropy coding techniques such as Huffman coding, arithmetic coding, or the like. In an example, the entropy encoder (923) uses arithmetic encoding and is an arithmetic encoder. In an example, the side information, such as the encoded bits (932), can be transmitted in the coded bitstream, for example, together with the encoded image (931).

The side information, such as the encoded bits (932), can be decompressed (e.g., entropy decoded) by the entropy decoder (924) to generate an output. The entropy decoder (924) can use entropy coding techniques such as Huffman coding, arithmetic coding, or the like. In an example, the entropy decoder (924) uses arithmetic decoding and is an arithmetic decoder. In an example, lossless compression is used in the entropy encoder (923), lossless decompression is used in the entropy decoder (924), and noises, such as due to the transmission of the side information are omissible, the output from the entropy decoder (924) can be the quantized latent $\hat{z}$. The hyper decoder (925) can decode the quantized latent $\hat{z}$ to generate the output $o_{hc}$. A relationship between the output $o_{hc}$ and the quantized latent $\hat{z}$ can be described using Eq. 7.

$$o_{hc} = f_6(\hat{z}; \theta_6) \quad \text{Eq. 7}$$

where a parameter $\theta_6$ represents parameters, such as weights used in convolution kernels in the hyper decoder (925) and biases (if biases are used in the hyper decoder (925)).

As described above, the compressed or encoded bits (932) can be added to the coded bitstream as the side information, which enables the entropy decoder (914) to use the conditional entropy model. Thus, the entropy model can be image-dependent and spatially adaptive, and thus can be more accurate than a fixed entropy model.

The NIC framework (900) can be suitably adapted, for example, to omit one or more components shown in FIG. 9, to modify one or more components shown in FIG. 9, and/or to include one or more components not shown in FIG. 9. In an example, a NIC framework using a fixed entropy model includes the first sub-NN (951), and does not include the second sub-NN (952). In an example, a NIC framework includes the components in the NIC framework (900) except the entropy encoder (923) and the entropy decoder (924).

In an embodiment, one or more components in the NIC framework (900) shown in FIG. 9 are implemented using neural network(s), such as CNN(s). Each NN-based component (e.g., the main encoder network (911), the main decoder network (915), the context model NN (916), the entropy parameter NN (917), the hyper encoder (921), or the hyper decoder (925)) in a NIC framework (e.g., the NIC framework (900)) can include any suitable architecture (e.g., have any suitable combinations of layers), include any suitable types of parameters (e.g., weights, biases, a combination of weights and biases, and/or the like), and include any suitable number of parameters.

In an embodiment, the main encoder network (911), the main decoder network (915), the context model NN (916), the entropy parameter NN (917), the hyper encoder (921), and the hyper decoder (925) are implemented using respective CNNs.

FIG. 10 shows an exemplary CNN of the main encoder network (911) according to an embodiment of the disclosure. For example, the main encoder network (911) includes four sets of layers where each set of layers includes a convolution layer 5×5 c192 s2 followed by a GDN layer. One or more layers shown in FIG. 10 can be modified and/or omitted. Additional layer(s) can be added to the main encoder network (911).

FIG. 11 shows an exemplary CNN of the main decoder network (915) according to an embodiment of the disclosure. For example, the main decoder network (915) includes three sets of layers where each set of layers includes a deconvolution layer 5×5 c192 s2 followed by an IGDN layer. In addition, the three sets of layers are followed by a deconvolution layer 5×5 c3 s2 followed by an IGDN layer. One or more layers shown in FIG. 11 can be modified and/or omitted. Additional layer(s) can be added to the main decoder network (915).

FIG. 12 shows an exemplary CNN of the hyper encoder (921) according to an embodiment of the disclosure. For example, the hyper encoder (921) includes a convolution layer 3×3 c192 s1 followed by a leaky ReLU, a convolution layer 5×5 c192 s2 followed by a leaky ReLU, and a convolution layer 5×5 c192 s2. One or more layers shown in FIG. 12 can be modified and/or omitted. Additional layer(s) can be added to the hyper encoder (921).

FIG. 13 shows an exemplary CNN of the hyper decoder (925) according to an embodiment of the disclosure. For example, the hyper decoder (925) includes a deconvolution layer 5×5 c192 s2 followed by a leaky ReLU, a deconvolution layer 5×5 c288 s2 followed by a leaky ReLU, and a deconvolution layer 3×3 c384 s1. One or more layers shown in FIG. 13 can be modified and/or omitted. Additional layer(s) can be added to the hyper encoder (925).

FIG. 14 shows an exemplary CNN of the context model NN (916) according to an embodiment of the disclosure. For example, the context model NN (916) includes a masked convolution 5×5 c384 s1 for context prediction, and thus the context $\hat{y}_{<i}$ in Eq. 4 includes a limited context (e.g., a 5×5 convolution kernel). The convolution layer in FIG. 14 can be modified. Additional layer(s) can be added to the context model NN (916).

FIG. 15 shows an exemplary CNN of the entropy parameter NN (917) according to an embodiment of the disclosure. For example, the entropy parameter NN (917) includes a convolution layer 1×1 c640 s1 followed by a leaky ReLU, a convolution layer 1×1 c512 s1 followed by leaky ReLU, and a convolution layer 1×1 c384 s1. One or more layers shown in FIG. 15 can be modified and/or omitted. Additional layer(s) can be added to the entropy parameter NN (917).

The NIC framework (900) can be implemented using CNNs, as described with reference to FIGS. 10-15. The NIC framework (900) can be suitably adapted such that one or more components (e.g., (911), (915), (916), (917), (921), and/or (925)) in the NIC framework (900) are implemented using any suitable types of neural networks (e.g., CNNs or non-CNN based neural networks). One or more other components the NIC framework (900) can be implemented using neural network(s).

The NIC framework (900) that includes neural networks (e.g., CNNs) can be trained to learn the parameters used in the neural networks. For example, when CNNs are used, the parameters represented by $\theta_1$-$\theta_6$, such as the weights used in the convolution kernels in the main encoder network (911) and biases (if biases are used in the main encoder network (911)), the weights used in the convolution kernels in the main decoder network (915) and biases (if biases are used in the main decoder network (915)), the weights used in the convolution kernels in the hyper encoder (921) and biases (if biases are used in the hyper encoder (921)), the weights used in the convolution kernels in the hyper decoder (925) and biases (if biases are used in the hyper decoder (925)), the weights used in the convolution kernel(s) in the context model NN (916) and biases (if biases are used in the context model NN (916)), and the weights used in the convolution kernels in the entropy parameter NN (917) and biases (if biases are used in the entropy parameter NN (917)), respectively, can be learned in the training process.

In an example, referring to FIG. 10, the main encoder network (911) includes four convolution layers where each convolution layer has a convolution kernel of 5×5 and 192 channels. Thus, a number of the weights used in the convolution kernels in the main encoder network (911) is 19200 (i.e., 4×5×5×192). The parameters used in the main encoder network (911) include the 19200 weights and optional biases. Additional parameter(s) can be included when biases and/or additional NN(s) are used in the main encoder network (911).

Referring to FIG. 9, the NIC framework (900) includes at least one component or module built on neural network(s). The at least one component can include one or more of the main encoder network (911), the main decoder network (915), the hyper encoder (921), the hyper decoder (925), the context model NN (916), and the entropy parameter NN (917). The at least one component can be trained individually. In an example, the training process is used to learn the parameters for each component separately. The at least one component can be trained jointly as a group. In an example, the training process is used to learn the parameters for a subset of the at least one component jointly. In an example, the training process is used to learn the parameters for all of the at least one component, and thus is referred to as an E2E optimization.

In the training process for one or more components in the NIC framework (900), the weights (or the weight coefficients) of the one or more components can be initialized. In an example, the weights are initialized based on pre-trained corresponding neural network model(s) (e.g., DNN models, CNN models). In an example, the weights are initialized by setting the weights to random numbers.

A set of training images can be employed to train the one or more components, for example, after the weights are initialized. The set of training images can include any suitable images having any suitable size(s). In some examples, the set of training images includes raw images, natural images, computer-generated images, and/or the like that are in the spatial domain. In some examples, the set of training images includes residue images having residue data in the spatial domain. The residue data can be calculated by a residue calculator (e.g., the residue calculator (723)). In some examples, training images (e.g., raw images and/or residue images including residue data) in the set of training images can be divided into blocks having suitable sizes, and the blocks and/or images can be used to train neural networks in a NIC framework. Thus, raw images, residue images, blocks from raw images, and/or blocks from residue images can be used to train neural networks in a NIC framework.

For purposes of brevity, the training process below is described using a training image as an example. The description can be suitably adapted to a training block. A training image t of the set of training images can be passed through the encoding process in FIG. 9 to generate a compressed representation (e.g., encoded information, for example, to a bitstream). The encoded information can be passed through the decoding process described in FIG. 9 to compute and reconstruct a reconstructed image E.

For the NIC framework (900), two competing targets, e.g., a reconstruction quality and a bit consumption are balanced. A quality loss function (e.g., a distortion or distortion loss) D $(t,\bar{t})$ can be used to indicate the reconstruction quality, such as a difference between the reconstruction (e.g., the reconstructed image) and an original image (e.g., the training image t). A rate (or a rate loss) R can be used to indicate the bit consumption of the compressed representation. In an example, the rate loss R further includes the side information, for example, used in determining a context model.

For neural image compression, differentiable approximations of quantization can be used in E2E optimization. In various examples, in the training process of neural network-based image compression, noise injection is used to simulate quantization, and thus quantization is simulated by the noise injection instead of being performed by a quantizer (e.g., the quantizer (912)). Thus, training with noise injection can approximate the quantization error variationally. A bits per pixel (BPP) estimator can be used to simulate an entropy coder, and thus entropy coding is simulated by the BPP estimator instead of being performed by an entropy encoder (e.g., (913)) and an entropy decoder (e.g., (914)). Therefore, the rate loss R in the loss function L shown in Eq. 1 during the training process can be estimated, for example, based on the noise injection and the BPP estimator. In general, a higher rate R can allow for a lower distortion D, and a lower rate R can lead to a higher distortion D. Thus, a trade-off hyperparameter λ in Eq. 1 can be used to optimize a joint R-D loss L where L as a summation of λD and R can be optimized. The training process can be used to adjust the parameters of the one or more components (e.g., (911), (915)) in the NIC framework (900) such that the joint R-D loss L is minimized or optimized.

Various models can be used to determine the distortion loss D and the rate loss R, and thus to determine the joint R-D loss L in Eq. 1. In an example, the distortion loss D (t, $\hat{t}$) is expressed as a peak signal-to-noise ratio (PSNR) that is a metric based on mean squared error, a multiscale structural similarity (MS-SSIM) quality index, a weighted combination of the PSNR and MS-SSIM, or the like.

In an example, the target of the training process is to train the encoding neural network (e.g., the encoding DNN), such as a video encoder to be used on an encoder side and the decoding neural network (e.g., the decoding DNN), such as a video decoder to be used on a decoder side. In an example, referring to FIG. 9, the encoding neural network can include the main encoder network (911), the hyper encoder (921), the hyper decoder (925), the context model NN (916), and the entropy parameter NN (917). The decoding neural network can include the main decoder network (915), the hyper decoder (925), the context model NN (916), and the entropy parameter NN (917). The video encoder and/or the video decoder can include other component(s) that are based on NN(s) and/or not based on NN(s).

The NIC framework (e.g., the NIC framework (900)) can be trained in an E2E fashion. In an example, the encoding neural network and the decoding neural network are updated jointly in the training process based on backpropagated gradients in an E2E fashion.

After the parameters of the neural networks in the NIC framework (900) are trained, one or more components in the NIC framework (900) can be used to encode and/or decode images. In an embodiment, on the encoder side, the video encoder is configured to encode the input image x into the encoded image (931) to be transmitted in the bitstream. The video encoder can include multiple components in the NIC framework (900). In an embodiment, on the decoder side, the corresponding video decoder is configured to decode the encoded image (931) in the bitstream into the reconstructed image $\bar{x}$. The video decoder can include multiple components in the NIC framework (900).

In an example, the video encoder includes all the components in the NIC framework (900), for example, when content-adaptive online training is employed.

Figure 16A:
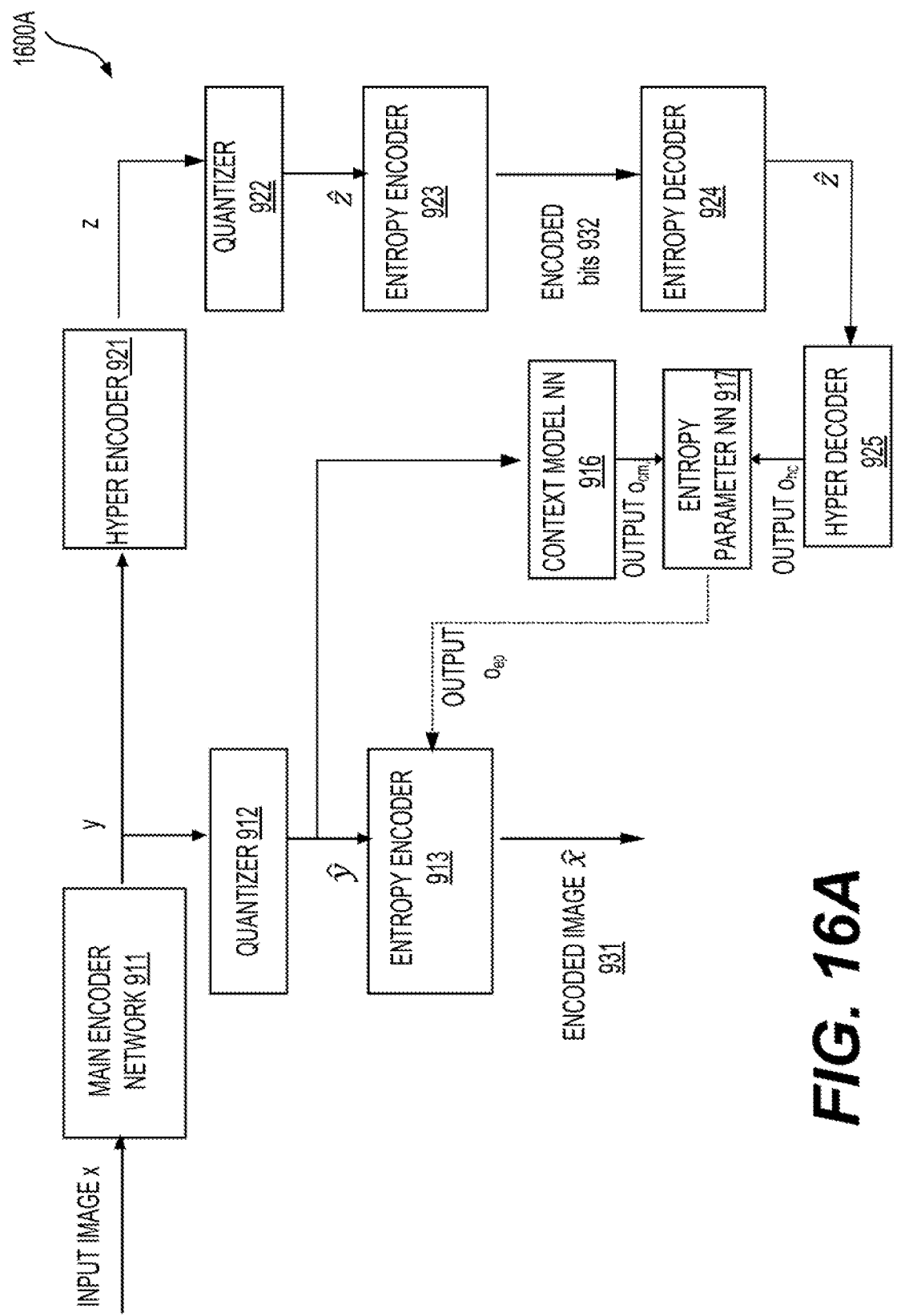
FIG. 16A shows an exemplary video encoder according to an embodiment of the disclosure.
Figure 16B:
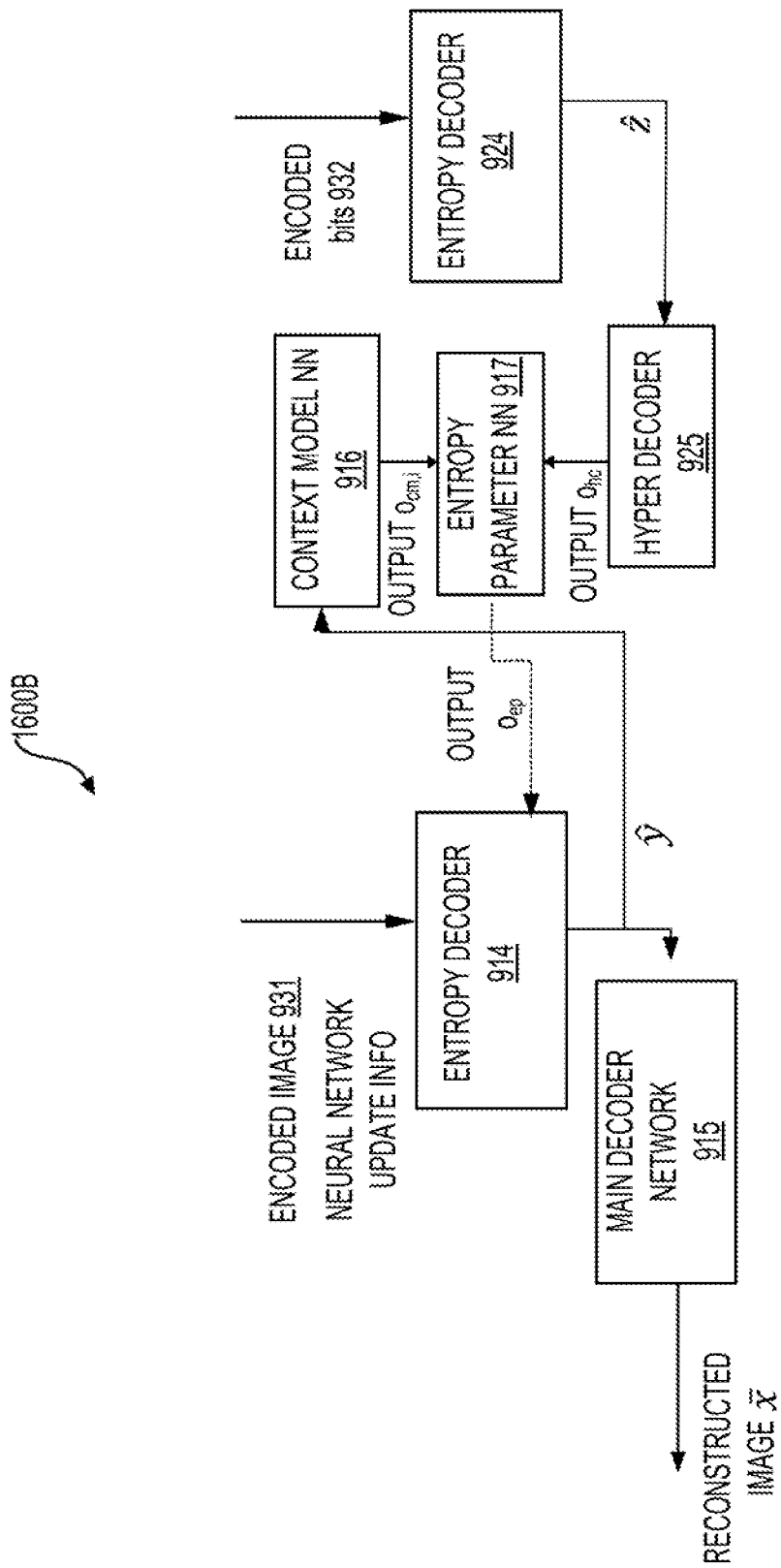
FIG. 16B shows an exemplary video decoder according to an embodiment of the disclosure.

FIG. 16A shows an exemplary video encoder (1600A) according to an embodiment of the disclosure. The video encoder (1600A) includes the main encoder network (911), the quantizer (912), the entropy encoder (913), and the second sub-NN (952) that are described with reference to FIG. 9 and detailed descriptions are omitted for purposes of brevity. FIG. 16B shows an exemplary video decoder (1600B) according to an embodiment of the disclosure. The video decoder (1600B) can correspond to the video encoder (1600A). The video decoder (1600B) can include the main decoder network (915), the entropy decoder (914), the context model NN (916), the entropy parameter NN (917), the entropy decoder (924), and the hyper decoder (925). Referring to FIGS. 16A-16B, on the encoder side, the video encoder (1600A) can generate the encoded image (931) and the encoded bits (932) to be transmitted in the bitstream. On the decoder side, the video decoder (1600B) can receive and decode the encoded image (931) and the encoded bits (932).

FIGS. 17-18 show an exemplary video encoder (1700) and a corresponding video decoder (1800), respectively, according to embodiments of the disclosure. Referring to FIG. 17, the encoder (1700) includes the main encoder network (911), the quantizer (912), and the entropy encoder (913). Examples of the main encoder network (911), the quantizer (912), and the entropy encoder (913) are described with reference to FIG. 9. Referring to FIG. 18, the video decoder (1800) includes the main decoder network (915) and the entropy decoder (914). Examples of the main decoder network (915) and the entropy decoder (914) are described with reference to FIG. 9. Referring to FIGS. 17 and 18, the video encoder (1700) can generate the encoded image (931) to be transmitted in the bitstream. The video decoder (1800) can receive and decode the encoded image (931).

As described above, the NIC framework (900) including the video encoder and the video decoder can be trained based on images and/or blocks in the set of training images. In some examples, an input image to be compressed (e.g., encoded) and/or transmitted has properties that are significantly different from the set of training images. Thus, encoding and decoding the input image directly using the video encoder and the video decoder trained based on the set of training images, respectively, can lead to a less optimal or a relatively poor R-D loss L (e.g., a relatively large distortion and/or a relatively large bit rate). Aspects of the disclosure include a content-adaptive online training method in NIC. Various content-adaptive online training processes can be used to improve a R-D loss L.

The NIC framework (900), the video encoder, and the video decoder that are trained by the set of training images can be referred to as the pretrained NIC framework (900), the pretrained video encoder, and the pretrained video decoder, respectively. Parameters in the pretrained NIC framework (900), the pretrained video encoder, and the pretrained video decoder are referred to as NIC pretrained parameters, encoder pretrained parameters, and decoder pretrained parameters, respectively.

In an embodiment, a NN-based training process is applied to iteratively update a feature representation of an input image (e.g., an image to be compressed and/or transmitted) into an updated feature representation to improve the R-D loss L. When the updated feature representation is encoded and decoded using the pretrained video encoder and the pretrained video decoder trained based on the set of training images, respectively, a final R-D loss L corresponding to the updated feature representation is obtained, and is less than an initial R-D loss L when the feature representation is encoded and decoded using the pretrained video encoder and the pretrained video decoder, respectively. The NN-based training process that updates the feature representation instead of updating one or more pretrained parameters in the NIC pretrained parameters in the pretrained NIC framework (900) can be referred to as a feature representation training process, such as an online feature representation training process. As the feature representation indicates feature(s) of the input image, the feature representation training process can be referred to as a feature training process. The feature training process is a content-adaptive online training process that is adaptive to the input image to be compressed, and is a learning-based image coding process based on NN(s).

Figure 19A:
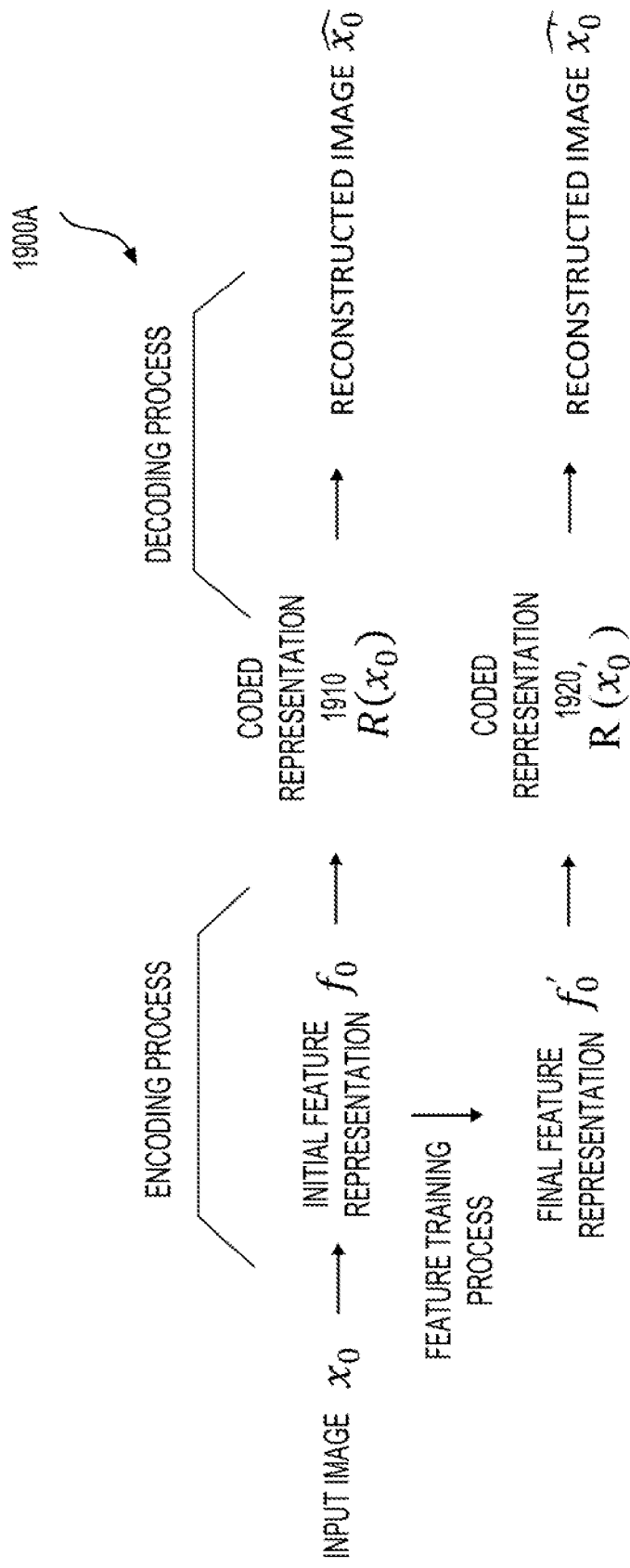
FIG. 19A shows an example of a learning-based image coding process according to an embodiment of the disclosure.

FIG. 19A shows an example of a learning-based image coding process (1900A) according to an embodiment of the disclosure. Learning-based image compression can be described as a two-step mapping process including an encoding mapping (or an encoding process and a decoding mapping (or a decoding process). In the encoding mapping by an encoder, an original image $x_0$ in an original space (e.g., a high dimensional space) can be mapped to a feature representation $f_0$. The feature representation $f_0$ can be mapped to a coded representation (1910) with a rate loss $R(x_0)$. The original image $x_0$ can be an input image to be encoded and/or transmitted, such as a raw image or an image including residue data. In the decoding mapping by a decoder, the coded representation (1910) can be mapped back to a reconstructed image $\hat{x}_0$ in the original space. The coded representation (1910) can be transmitted in a bitstream, and the rate loss $R(x_0)$ that is determined based on the coded representation (1910) can indicate a bit consumption of the encoded image (1910). As described above, a distortion loss of the reconstructed image $\hat{x}_0$ is $D(x_0, \hat{x}_0)$ indicating a difference between the reconstructed image $\hat{x}_0$ and the original image $x_0$, and a corresponding R-D loss L1 can be obtained using Eq. 1 as L1=$\lambda D(x_0,\hat{x}_0)+R(x_0)$.

Referring to FIG. 19A, a feature representation $f'_0$ (e.g., a substitution feature representation) can be determined from the feature representation $f_0$ by a feature training process. The substitution feature representation $f'_0$ can be mapped to a reconstructed image $\hat{x}'_0$ using the same encoding mapping and the decoding mapping. A distortion loss of the reconstructed image $\hat{x}'_0$ is $D(x_0, \hat{x}_0)$ indicating a difference between the reconstructed image $\hat{x}'_0$ and the original image $x_0$, and a corresponding R-D loss L2 can be obtained using Eq. 1 as L2=$\lambda D(x_0,\hat{x}'_0)+R(x'_0)$ where $R(x'_0)$ is a rate loss for a coded representation (1920) of the substitution feature representation $f'_0$. In an embodiment, the feature representation $f_0$ is iteratively trained (e.g., updated) using a NN-based training process to obtain the feature representation $f'_0$ such that L2 is reduced and is smaller than L1, and thus better video coding performance is achieved.

When L2 is smaller than L1, the distortion loss $D(x_0, \hat{x}'_0)$ can be less than the distortion loss $D(x_0, \hat{x}_0)$, and thus the reconstructed image $\hat{x}'_0$ obtained based on the feature representation $f'_0$ is more accurate than the reconstructed image $\hat{x}_0$) obtained based on the feature representation $f_0$. In some examples, the distortion loss $D(x_0, \hat{x}'_0)$ is larger than the distortion loss $D(x_0, \hat{x}_0)$, however, the rate loss $R(\hat{x}'_0)$ is less than the rate loss $R(x_0)$ where a global minimum of the R-D loss can be achieved as L2 is less than L1.

In an embodiment, during an encoding process from the original image $x_0$ to a coded representation (e.g., (1910)), the original image $x_0$ is modified in one or more stages. In some embodiments, intermediate representation(s) such as the feature representation $f_0$ of the original image $x_0$ can be generated in the encoding process. A substitution or an update may be made to one of the intermediate representation(s) to reduce the R-D loss L, and thus improving coding efficiency. In an example, the encoding process is implemented based on a NN (e.g., a DNN, a CNN), and one or more feature maps are generated in a CNN. The feature representation $f_0$ can include one of the feature maps and can be updated to reduce the R-D loss L. For example, the one of the feature maps can include a 2D matrix, and values of a plurality of elements in the 2D matrix are updated to update the one of the feature maps. The plurality of elements can include the entire 2D matrix, one or more rows, one or more columns, or one or more elements in the 2D matrix.

Referring back to FIG. 10, the main encoder network (911) includes normalization layers (e.g., GDNs) and multiple convolutional layers and multiple (e.g., 192) channels for each convolutional layer. In an example, the feature representation $f_0$ is an output of the main encoder network (911). In an example, the feature representation $f_0$ is an output of a convolutional layer in the main encoder network (911). In an example, the feature representation $f_0$ is an output of a GDN in the main encoder network (911). In an example, the main encoder network (911) includes multiple sub-NNs, such as a first sub-NN and a second sub-NN. The feature representation $f_0$ can be an output of one of the multiple sub-NNs.

In a preprocessing module, a gradient of the R-D loss L can be used to update the feature representation $f_0$ of an input image. As described above, the model (e.g., the R-D loss L including the rate loss R and the distortion loss D) can be differentiable and the gradients can be backpropagated, for example, by replacing non-differentiable operations with differentiable operations (e.g., replacing quantization with noise injection). Therefore, the above optimization can be iteratively solved with a gradient descent.

To differentiate the feature representation $f_0$ before the feature training process and the updated feature representation $f'_0$ after the feature training process, the initial feature representation $f_0$ before the feature training process is referred to as an initial feature representation $f_0$. The updated feature representation $f'_0$ after the feature training process is referred to as a final feature representation $f'_0$.

The learning-based image coding process, such as the feature training process, described above can be applied to an initial feature representation corresponding to an input image to be encoded to update iteratively the initial feature representation to a final feature representation to reduce the joint R-D loss L. The feature training process can be used as a preprocessing step for boosting the compression performance of a pretrained E2E NIC compression method.

The feature training process can include multiple epochs (e.g., iterations) where the initial feature representation is updated in an iterative update process. In an embodiment, the initial feature representation is generated from the input image to be encoded, and an iterative update of one or more values of respective one or more elements in the initial feature representation is performed in the feature training process until one of (i) a training loss (e.g., a R-D loss L) corresponding to the final feature representation or (ii) a number of iterations of the iterative update satisfies a pre-determined condition. As described above, referring to FIG. 19A, the training loss (e.g., the R-D loss L) corresponding to the final feature representation (e.g., $f'_0$) can be determined based on a bit consumption or a rate loss (e.g., $R(x'_0)$) of a coded representation (e.g., (1920)) of the final feature representation and a difference $D(x_0,\hat{x}'_0)$ between the input image (e.g., $x_0$) and a reconstructed image (e.g., $\hat{x}'_0$) of the final feature representation.

The feature training process (e.g., the iterative update) can stop when the training loss (e.g., the R-D loss L) has flattened or is about to flatten. In an example, the feature training process stops when the training loss is below a first threshold. In an example, the feature training process stops when a difference between two successive training losses is below a second threshold.

Two hyperparameters (e.g., a step size and a maximum number of steps) can be used in the feature training process together with the training loss function (e.g., the R-D loss L). The maximum number of iterations can be used as a threshold of a maximum number of iterations to terminate the feature training process. In an example, the feature training process stops when the number of iterations reaches the maximum number of iterations.

Referring to FIG. 19A, in the encoding process of the feature training process, the coded representation (e.g., (1920)) of the final feature representation (e.g., $f'_0$) can be generated based on the final feature representation, for example, by an encoding NN and at least one training module where the final feature representation (e.g., $f'_0$) has been updated from the initial feature representation (e.g., $f_0$) by the number of iterations of the iterative update. In a decoding process of the feature training process, the reconstructed image (e.g., $\hat{x}'_0$) of the final feature representation can be generated based on the coded representation of the final feature representation by a decoding NN.

An encoded image corresponding to the final feature representation having one or more updated values can be generated by a video encoder, for example, after the feature training process. A coded bitstream that includes the encoded image can be generated. In an example, the encoded image is transmitted in the coded bitstream.

Figure 19B:
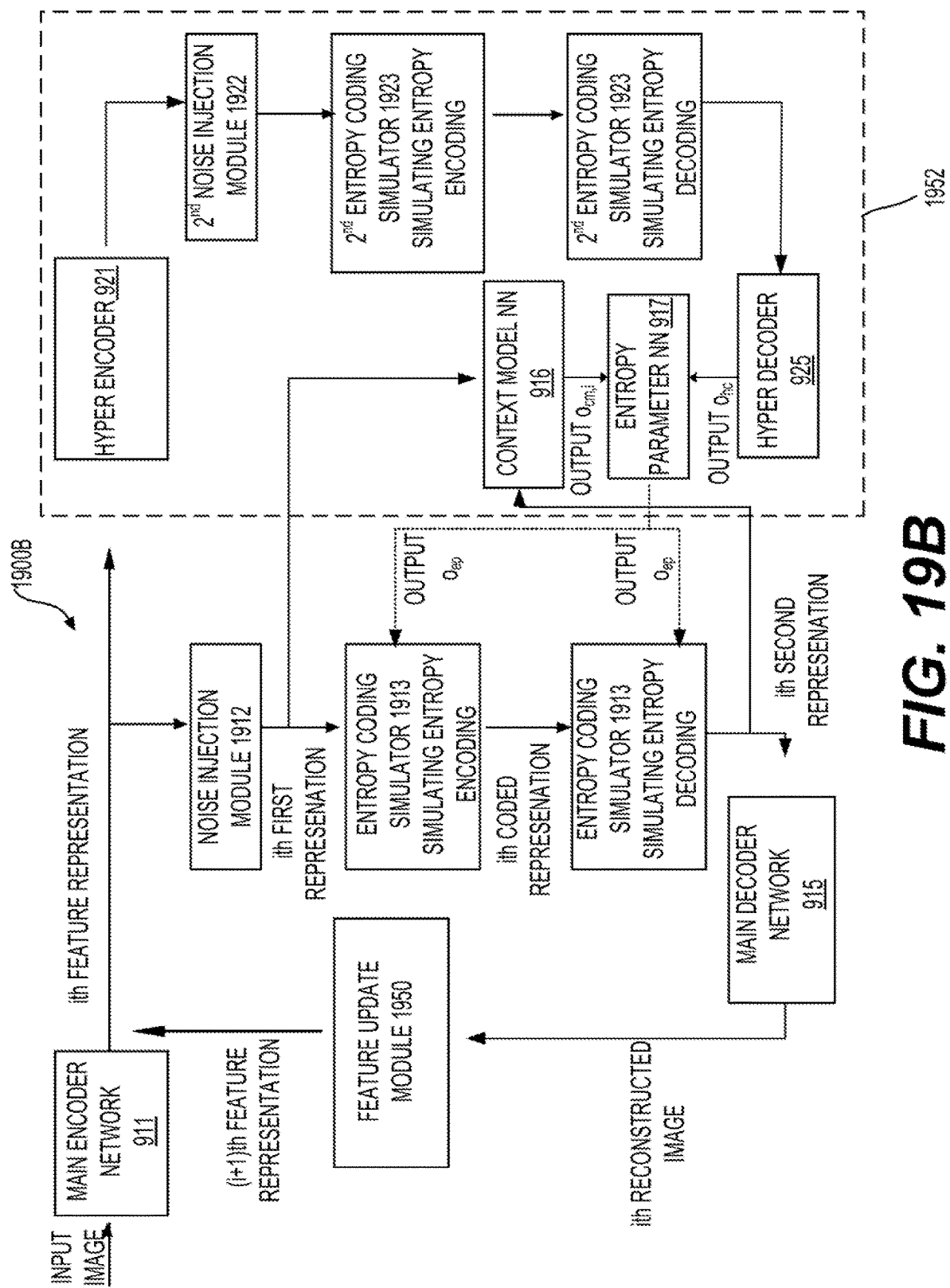
FIG. 19B shows an exemplary NIC framework according to an embodiment of the disclosure.

The feature training process can be described in detail below. A NIC framework, such as the NIC framework (900) in FIG. 9 can be used to perform the iterative update. FIG. 19B shows an exemplary NIC framework (1900B) according to an embodiment of the disclosure. The feature training process can be implemented using the NIC framework (1900B). The NIC framework (1900B) can include one or more of the main encoder network (911), the main decoder network (915), the hyper encoder (921), the hyper decoder (925), the context model NN (916), and the entropy parameter NN (917) that are described in FIG. 9. The NIC framework (1900B) can include a noise injection module (1912) that replaces the quantizer (912) in FIG. 9, and an entropy coding simulator (1913) that can simulate entropy encoding performed by the entropy encoder (913) and entropy decoding performed by the entropy decoder (914) in FIG. 9. The NIC framework (1900B) can include a feature update module (1950).

An input image to be compressed is fed into the main encoder network (911) and an initial feature representation is generated by the main encoder network (911).

To illustrate the iterative update, the initial feature representation is denoted as $f_0$ and the final feature representation is denoted as $f'_0$. The iterative update includes multiple iterations, and each iteration is denoted as an ith iteration where i is a positive integer range from 1 to K and K represents the number of iterations (e.g., a total number of iterations before the iterative update stops). For example, the final feature representation is generated in the Kth iteration. In the 1$^{st}$ iteration, the 1$^{st}$ feature representation is the initial feature representation $f_0$.

The ith iteration is described as follows. In an encoding process of the ith iteration, noise can be added to the ith feature representation by the noise injection module (1912) to generate an ith first representation. An ith coded representation can be generated based on the ith first representation by the entropy coding simulator (1913) that simulates the entropy encoding.

In a decoding process of the ith iteration, an ith second representation can be generated from the ith coded representation by the entropy coding simulator (1913) that simulates the entropy decoding. An ith reconstructed image can be generated by a decoding NN, such as the main decoder network (915), based on the ith second representation.

As described above, in the training process of NN-based image compression, noise injection can be used to simulate quantization to approximate a quantization error variationally. The entropy coding simulator (1913) (e.g., a BPP estimator) can be used to simulate an entropy coder. Therefore, the rate loss R in the loss function L such as shown in Eq. 1 for the ith iteration can be estimated, for example, based on the noise injection and the entropy coding estimator. In the ith iteration, the training loss (e.g., the R-D loss L) corresponding to the ith feature representation can be obtained as a sum of the estimated rate loss R and the distortion loss D. Whether the training loss (e.g., the R-D loss L) corresponding to the ith feature representation or (ii) a number (e.g., i) of iterations of the iterative update satisfies the pre-determined condition can be determined. If the training loss corresponding to the ith feature representation or (ii) the number (e.g., i) of iterations of the iterative update satisfies the pre-determined condition, the iterative update stops, and the ith feature representation is determined to be the final feature representation. The number of iterations is i.

If neither the training loss for the ith feature representation nor (ii) the number (e.g., i) of iterations of the iterative update satisfies the pre-determined condition, adjustment(s) to the one or more values in the ith feature representation can be determined, for example, by the feature update module (1950) based on a gradient (e.g., a gradient of the R-D loss L with respect to a value in the ith feature representation) and the step size. As described above, the one or more values correspond to values of one or more elements (e.g., one or more rows, one or more columns, a subset or a complete set of elements in a 2D matrix) in the ith feature representation. An (i+1)th feature representation can be generated by the feature update module (1950) based on the gradient and the step size. The iterative update continues to the (i+1)th iteration and the like until the training loss corresponding to the final feature representation or the number of iterations of the iterative update satisfies the pre-determined condition.

According to an embodiment of the disclosure, the input image is not being updated directly in the iterative update. Instead, the initial feature presentation of the input image is updated to the final feature presentation, and the coded presentation is generated based on the final feature presentation.

In some examples, in the ith iteration, a context model that is an entropy model is determined based on the ith feature representation by using a sub-network (1952). The sub-network (1952) is identical or similar to the second sub-network (952) except that a second noise injection module (1922) replaces the quantizer (922), and a second entropy coding simulator (1923) that can simulate entropy encoding and decoding replaces the entropy encoder (923) and the entropy decoder (924), as described above. The ith coded representation can be generated based on the ith first representation with the determined context model. The determined context model is dependent on the ith feature representation, and thus is feature dependent. Accordingly, the context model can be more accurate than a fixed entropy model.

Referring to FIG. 19B, additional component(s) can be used in the encoding process between the main encoder network (911) and the noise injection module (1912), and thus another type of feature representation can be generated. An iterative update can be performed on the other feature representation.

The step size can indicate a learning rate of the feature training process. The step size can be used in a gradient descent algorithm or a backpropagation calculation performed in a feature training process. A step size can be determined using any suitable method. In an embodiment, different step sizes are used for images (or feature representations) with different types of contents to achieve optimal results. Different types can refer to different variances. In an example, the step size is determined based on a variance of a feature representation. For example, a step size of a feature representation having a high variance is larger than a step size of a feature representation having a low variance where the high variance is larger than the low variance.

In an embodiment, a first step size can be used to run a certain number (e.g., 100) iterations. Then, a second step size (e.g., the first step size plus or minus a size increment) can be used to run the certain number of iterations. Results from the first step size and the second step size can be compared to determine a step size to be used. More than two step sizes may be tested to determine an optimal step size.

A step size can vary during the feature training process. The step size can have an initial value at an onset of the feature training process, and the initial value can be reduced (e.g., halved) at a later stage of the feature training process, for example, after a certain number of iterations to achieve a finer tuning. The step size or the learning rate can be varied by a scheduler during the iterative feature training process. The scheduler can include a parameter adjustment method used to adjust the step size. The scheduler can determine a value for the step size such that the step size can increase, decrease, or remain constant in a number of intervals. In an example, the learning rate is altered in each step by the scheduler. A single scheduler or multiple different schedulers can be used for different feature representations. Thus, multiple final feature representations can be generated based on the multiple schedulers, and one of the multiple final feature representations with the better compression performance (e.g., a smaller R-D loss) can be chosen.

Figure 19C:
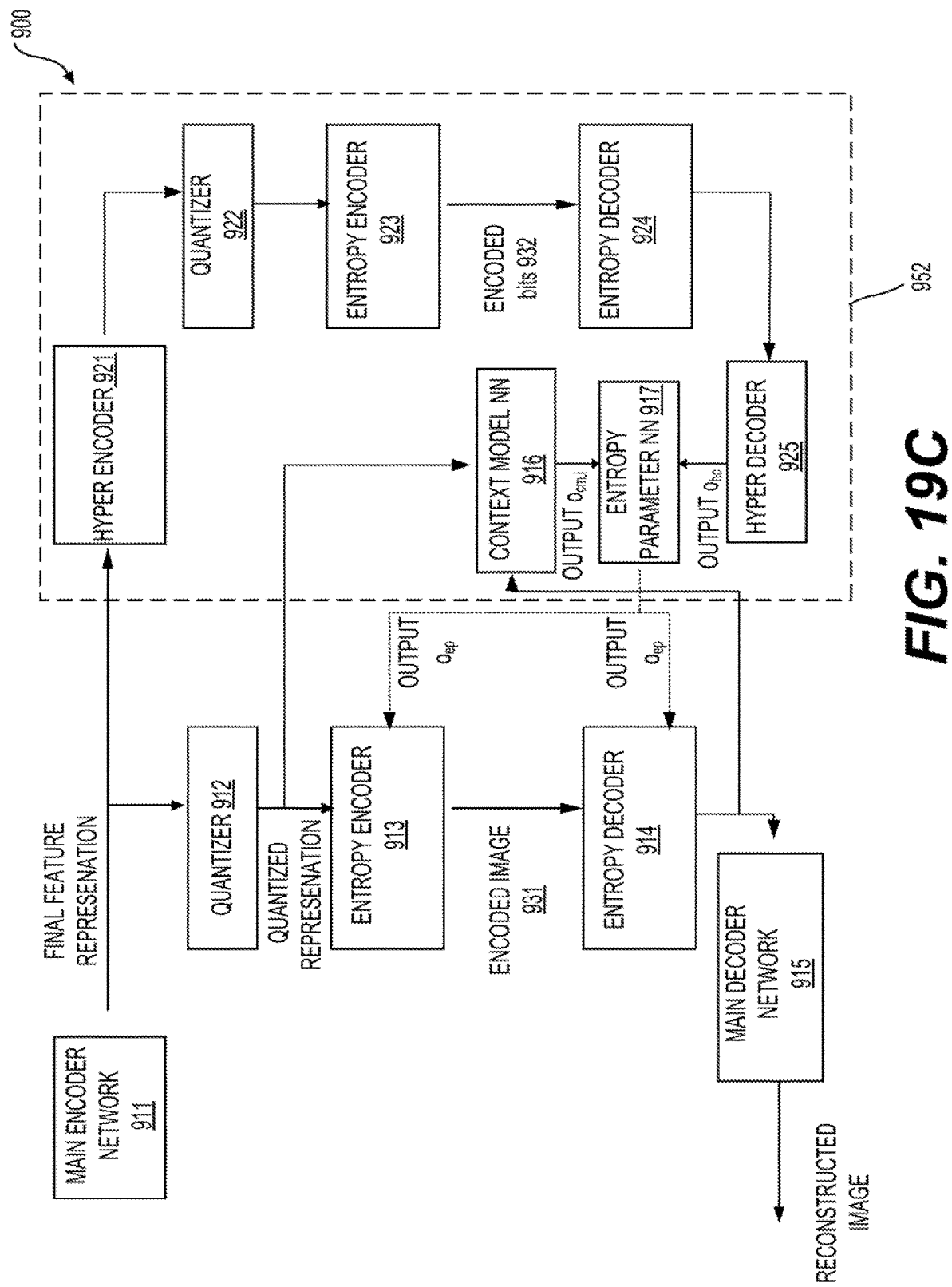
FIG. 19C shows an exemplary encoding process based on a NIC framework according to an embodiment of the disclosure.

As described above, the encoded image corresponding to the final feature representation $f_o$ having the one or more updated values can be generated by a video encoder, such as shown in FIG. 19C. FIG. 19C shows an exemplary encoding process based on the NIC framework (900) according to an embodiment of the disclosure. The components in the NIC framework (900) are described with reference to FIG. 9.

The initial feature representation is generated from the input image prior to the iterative update. Accordingly, after obtaining the final feature representation based on the iterative update, certain encoding components (e.g., the main encoder network (911) or part of the main encoder network (911)) may not be used in generating the encoded image (931) from the final feature representation. Referring to FIG. 19C, the final feature representation that is determined by the iterative update can be quantized into a quantized representation by the quantizer (912). The encoded image (e.g., (931)) can be generated based on the quantized representation. In an example shown in FIG. 19C, the initial feature representation is the output of the main encoder network (911), and thus the main encoder network (911) is not used to encode the encoded image (931) from the final feature representation. In some examples, the main encoder network (911) can include multiple sub-NNs (e.g., a first sub-NN followed by a second sub-NN) or multiple convolutional layers. For example, the initial feature representation is an output of the first sub-NN in the main encoder network (911). In an example, the first sub-NN is not used to generate the encoded image (931). The second sub-NN is used to generate the encoded image (931) from the final feature representation.

The quantized representation can be entropy encoded into the encoded image (931) by the entropy encoder (913). In an example, the entropy encoding comprises arithmetic encoding where the entropy encoder (913) is an arithmetic encoder.

In an example, a context model can be determined based on the final feature representation using the second sub-network (952), as described with reference to FIG. 9. The quantized representation can be entropy encoded into the encoded image (931) based on the determined context model by using the entropy encoder (913). The determined context model is dependent on the final feature representation, and thus is feature dependent. Accordingly, the context model can be more accurate than a fixed entropy model.

In an example, the encoded image (931) is transmitted in a coded video bitstream. On a decoder side, a video decoder can obtain a reconstructed image of the final feature representation by decoding the encoded image (931). As described above with reference to FIG. 9, the encoded bits (932) can be transmitted in the coded video bitstream.

The NIC framework used in the iterative update can include any type of neural networks and use any neural network-based image compression methods, such as a context-hyperprior encoder-decoder framework (e.g., the NIC framework shown in FIG. 9)), a scale-hyperprior encoder-decoder framework, a Gaussian Mixture Likelihoods framework and variants of the Gaussian Mixture Likelihoods framework, an RNN-based recursive compression method and variants of the RNN-based recursive compression method, and the like.

As described above, various content-adaptive online training process can be used to improve a R-D loss L. For example, one or more pretrained parameters used in a NIC framework can be trained based on one or more images to be compressed (e.g., encoded) and/or transmitted, and content-adaptive online training of the one or more pretrained parameters can be referred to as a parameter training process (e.g., an online parameter training process) or a finetuning process, as described below.

In some examples, the one or more images to be compressed (e.g., encoded) and/or transmitted have properties that are significantly different from the set of training images. Thus, encoding and decoding the one or more images using the video encoder and the video decoder trained based on the set of training images, respectively, can lead to a relatively poor R-D loss L (e.g., a relatively large distortion and/or a relatively large bit rate).

In order to differentiate the training process based on the set of training images and the content-adaptive online training process for the one or more pretrained parameters based on the one or more images to be compressed (e.g., encoded) and/or transmitted, the NIC framework (900), the video encoder, and the video decoder that are trained by the set of training images are referred to as the pretrained NIC framework (900), the pretrained video encoder, and the pretrained video decoder, respectively. Parameters in the pretrained NIC framework (900), the pretrained video encoder, or the pretrained video decoder are referred to as NIC pretrained parameters, encoder pretrained parameters, and decoder pretrained parameters, respectively. In an example, the NIC pretrained parameters includes the encoder pretrained parameters and the decoder pretrained parameters. In an example, the encoder pretrained parameters and the decoder pretrained parameters do not overlap where none of the encoder pretrained parameters is included in the decoder pretrained parameters. For example, the encoder pretrained parameters (e.g., pretrained parameters in the main encoder network (911)) in (1700) and the decoder pretrained parameters (e.g., pretrained parameters in the main decoder network (915)) in (1800) do not overlap. In an example, the encoder pretrained parameters and the decoder pretrained parameters overlap where at least one of the encoder pretrained parameters is included in the decoder pretrained parameters. For example, the encoder pretrained parameters (e.g., pretrained parameters in the context model NN (916)) in (1600A) and the decoder pretrained parameters (e.g., the pretrained parameters in the context model NN (916)) in (1600B) overlap. The NIC pretrained parameters can be obtained based on blocks and/or images in the set of training images.

One or more pretrained parameters in the NIC pretrained parameters in the pretrained NIC framework (900) can further be trained (e.g., finetuned) based on the one or more images to be encoded and/or transmitted where the one or more images can be different from the set of training images. The one or more pretrained parameters used in the NIC pretrained parameters can be finetuned by optimizing the joint R-D loss L based on the one or more images. The one or more pretrained parameters that have been finetuned by the one or more images are referred to as the one or more replacement parameters or the one or more finetuned parameters. In an embodiment, after the one or more pretrained parameters in the NIC pretrained parameters have been finetuned (e.g., replaced) by the one or more replacement parameters, neural network update information is encoded into a bitstream to indicate the one or more replacement parameters or a subset of the one or more replacement parameters. In an example, the NIC framework (900) is updated (or finetuned) where the one or more pretrained parameters are replaced by the one or more replacement parameters, respectively.

In a first scenario, the one or more pretrained parameters includes a first subset of the one or more pretrained parameters and a second subset of the one or more pretrained parameters. The one or more replacement parameters includes a first subset of the one or more replacement parameters and a second subset of the one or more replacement parameters.

The first subset of the one or more pretrained parameters is used in the pretrained video encoder and is replaced by the first subset of the one or more replacement parameters, for example, in the training process. Thus, the pretrained video encoder is updated to the updated video encoder by the training process. The neural network update information can indicate the second subset of the one or more replacement parameters that is to replace the second subset of the one or more replacement parameters. The one or more images can be encoded using the updated video encoder and transmitted in the bitstream with the neural network update information.

On the decoder side, the second subset of the one or more pretrained parameters is used in the pretrained video decoder. In an embodiment, the pretrained video decoder receives and decodes the neural network update information to determine the second subset of the one or more replacement parameters. The pretrained video decoder is updated to the updated video decoder when the second subset of the one or more pretrained parameters in the pretrained video decoder is replaced by the second subset of the one or more replacement parameters. The one or more encoded images can be decoded using the updated video decoder.

FIGS. 16A-16B show an example of the first scenario. For example, the one or more pretrained parameters include N1 pretrained parameters in the pretrained context model NN (916) and N2 pretrained parameters in the pretrained main decoder network (915). Thus, the first subset of the one or more pretrained parameters include the N1 pretrained parameters, and the second subset of the one or more pretrained parameters are identical to the one or more pretrained parameters. Accordingly, the N1 pretrained parameters in the pretrained context model NN (916) can be replaced by N1 corresponding replacement parameters such that the pretrained video encoder (1600A) can be updated to the updated video encoder (1600A). The pretrained context model NN (916) is also updated to be the updated context model NN (916). On the decoder side, the N1 pretrained parameters can be replaced by the N1 corresponding replacement parameters and the N2 pretrained parameters can be replaced by N2 corresponding replacement parameters, updating the pretrained context model NN (916) to be the updated context model NN (916) and updating the pretrained main decoder network (915) to be the updated main decoder network (915). Thus, the pretrained video decoder (1600B) can be updated to the updated video decoder (1600B).

In a second scenario, none of the one or more pretrained parameters is used in the pretrained video encoder on the encoder side. Rather, the one or more pretrained parameters is used in the pretrained video decoder on the decoder side. Thus, the pretrained video encoder is not updated and continues to be the pretrained video encoder after the training process. In an embodiment, the neural network update information indicates the one or more replacement parameters. The one or more images can be encoded using the pretrained video encoder and transmitted in the bitstream with the neural network update information.

On the decoder side, the pretrained video decoder can receive and decode the neural network update information to determine the one or more replacement parameters. The pretrained video decoder is updated to the updated video decoder when the one or more pretrained parameters in the pretrained video decoder is replaced by the one or more replacement parameters. The one or more encoded images can be decoded using the updated video decoder.

FIGS. 16A-16B show an example of the second scenario. For example, the one or more pretrained parameters include N2 pretrained parameters in the pretrained main decoder network (915). Thus, none of the one or more pretrained parameters is used in the pretrained video encoder (e.g., the pretrained video encoder (1600A)) on the encoder side. Thus, the pretrained video encoder (1600A) continues to be the pretrained video encoder after the training process. On the decoder side, the N2 pretrained parameters can be replaced by N2 corresponding replacement parameters, which update the pretrained main decoder network (915) to the updated main decoder network (915). Thus, the pretrained video decoder (1600B) can be updated to the updated video decoder (1600B).

In a third scenario, the one or more pretrained parameters are used in the pretrained video encoder and are replaced by the one or more replacement parameters, for example, in the training process. Thus, the pretrained video encoder is updated to the updated video encoder by the training process. The one or more images can be encoded using the updated video encoder and transmitted in the bitstream. No neural network update information is encoded in the bitstream. On the decoder side, the pretrained video decoder is not updated and remains the pretrained video decoder. The one or more encoded images can be decoded using the pretrained video decoder.

FIGS. 16A-16B show an example of the third scenario. For example, the one or more pretrained parameters are in the pretrained main encoder network (911). Accordingly, the one or more pretrained parameters in the pretrained main encoder network (911) can be replaced by the one or more replacement parameters such that the pretrained video encoder (1600A) can be updated to be the updated video encoder (1600A). The pretrained main encoder network (911) is also updated to be the updated main encoder network (911). On the decoder side, the pretrained video decoder (1600B) is not updated.

In various example, such as described in the first, second, and third scenarios, video decoding may be performed by pretrained decoders having different capabilities, including decoders with and without capabilities to update the pretrained parameters.

In an example, compression performance can be increased by coding the one or more images with the updated video encoder and/or the updated video decoder as compared to coding the one or more images with the pretrained video encoder and the pretrained video decoder. Therefore, the content-adaptive online training method can be used to adapt a pretrained NIC framework (e.g., the pretrained NIC framework (900)) to target image content (e.g., the one or more images to be transmitted), and thus finetuning the pretrained NIC framework. Accordingly, the video encoder on the encoder side and/or the video decoder on the decoder side can be updated.

The content-adaptive online training method can be used as a preprocessing step (e.g., pre-encoding step) for boosting the compression performance of a pretrained E2E NIC compression method.

In an embodiment, the one or more images include a single input image, and the finetuning process is performed with the single input image. The NIC framework (900) is trained and updated (e.g., finetuned) based on the single input image. The updated video encoder on the encoder side and/or the updated video decoder on the decoder side can be used to code the single input image and optionally other input images. The neural network update information can be encoded into the bitstream together with the encoded single input image.

In an embodiment, the one or more images include multiple input images, and the finetuning process is performed with the multiple input images. The NIC framework (900) is trained and updated (e.g., finetuned) based on the multiple input images. The updated video encoder on the encoder side and/or the updated decoder on the decoder side can be used to code the multiple input images and optionally other input images. The neural network update information can be encoded into the bitstream together with the encoded multiple input images.

The rate loss R can increase with the signaling of the neural network update information in the bitstream. When the one or more images include the single input image, the neural network update information is signaled for each encoded image, and a first increase to the rate loss R is used to indicate the increase to the rate loss R due to the signaling of the neural network update information per image. When the one or more images include the multiple input images, the neural network update information is signaled for and shared by the multiple input images, and a second increase to the rate loss R is used to indicate the increase to the rate loss R due to the signaling of the neural network update information per image. Because the neural network update information is shared by the multiple input images, the second increase to the rate loss R can be less than the first increase to the rate loss R. Thus, in some examples, it can be advantageous to finetune the NIC framework using the multiple input images.

In an embodiment, the one or more pretrained parameters to be updated are in one component of the pretrained NIC framework (900). Thus, the one component of the pretrained NIC framework (900) is updated based on the one or more replacement parameters, and other components of the pretrained NIC framework (900) are not updated.

The one component can be the pretrained context model NN (916), the pretrained entropy parameter NN (917), the pretrained main encoder network (911), the pretrained main decoder network (915), the pretrained hyper encoder (921), or the pretrained hyper decoder (925). The pretrained video encoder and/or the pretrained video decoder can be updated depending on which of the components in the pretrained NIC framework (900) is updated.

In an example, the one or more pretrained parameters to be updated are in the pretrained context model NN (916), and thus the pretrained context model NN (916) is updated and the remaining components (911), (915), (921), (917), and (925) are not updated. In an example, the pretrained video encoder on the encoder side and the pretrained video decoder on the decoder side include the pretrained context model NN (916), and thus both the pretrained video encoder and the pretrained video decoder are updated.

In an example, the one or more pretrained parameters to be updated are in the pretrained hyper decoder (925), and thus the pretrained hyper decoder (925) is updated and the remaining components (911), (915), (916), (917), and (921) are not updated. Thus, the pretrained video encoder is not updated and the pretrained video decoder is updated.

In an embodiment, the one or more pretrained parameters to be updated are in multiple components of the pretrained NIC framework (900). Thus, the multiple components of the pretrained NIC framework (900) are updated based on the one or more replacement parameters. In an example, the multiple components of the pretrained NIC framework (900) include all the components configured with neural networks (e.g., DNNs, CNNs). In an example, the multiple components of the pretrained NIC framework (900) include the CNN-based components: the pretrained main encoder network (911), the pretrained main decoder network (915), the pretrained context model NN (916), the pretrained entropy parameter NN (917), the pretrained hyper encoder (921), and the pretrained hyper decoder (925).

As described above, in an example, the one or more pretrained parameters to be updated are in the pretrained video encoder of the pretrained NIC framework (900). In an example, the one or more pretrained parameters to be updated are in the pretrained video decoder of the NIC framework (900). In an example, the one or more pretrained parameters to be updated are in the pretrained video encoder and the pretrained video decoder of the pretrained NIC framework (900).

The NIC framework (900) can be based on neural networks, for example, one or more components in the NIC framework (900) can include neural networks, such as CNNs, DNNs, and/or the like. As described above, the neural networks can be specified by different types of parameters, such as weights, biases, and the like. Each neural network-based component (e.g., the context model NN (916), the entropy parameter NN (917), the main encoder network (911), the main decoder network (915), the hyper encoder (921), or the hyper decoder (925)) in the NIC framework (900) can be configured with suitable parameters, such as respective weights, biases, or a combination of weights and biases. When CNN(s) are used, the weights can include elements in convolution kernels. One or more types of parameters can be used to specify the neural networks. In an embodiment, the one or more pretrained parameters to be updated are bias term(s), and only the bias term(s) are replaced by the one or more replacement parameters. In an embodiment, the one or more pretrained parameters to be updated are weights, and only the weights are replaced by the one or more replacement parameters. In an embodiment, the one or more pretrained parameters to be updated include the weights and bias term(s), and all the pretrained parameters including the weights and bias term(s) are replaced by the one or more replacement parameters. In an embodiment, other parameters can be used to specify the neural networks, and the other parameters can be finetuned.

The finetuning process can include multiple iterations where the one or more pretrained parameters are updated in an iterative finetuning process. The finetuning process can stop when a training loss has flattened or is about to flatten. In an example, the finetuning process stops when the training loss (e.g., a R-D loss L) is below a first threshold. In an example, the finetuning process stops when a difference between two successive training losses is below a second threshold.

As described above in the feature training process, two hyperparameters (e.g., a step size and a maximum number of steps) can be used in the finetuning process together with a loss function (e.g., an R-D loss L). The maximum number of iterations can be used as a threshold of a maximum number of iterations to terminate the finetuning process. In an example, the finetuning process stops when a number of iterations reaches the maximum number of iterations. The selection of the step size is described above in the feature training process, and can be adapted to the image training process. For example, the step size can be determined based on a variance of an image used to update a NIC framework. At the end of the finetuning process, one or more updated parameters can be computed for the respective one or more replacement parameters. In an embodiment, the one or more updated parameters are calculated as differences between the one or more replacement parameters and the corresponding one or more pretrained parameters. In an embodiment, the one or more updated parameters are the one or more replacement parameters, respectively.

In an embodiment, the one or more updated parameters can be generated from the one or more replacement parameters, for example, using a certain linear or nonlinear transform, and the one or more updated parameters are representative parameter(s) generated based on the one or more replacement parameters. The one or more replacement parameters are transformed into the one or more updated parameters for better compression.

A first subset of the one or more updated parameters corresponds to the first subset of the one or more replacement parameters, and a second subset of the one or more updated parameters corresponds to the second subset of the one or more replacement parameters.

In an example, the one or more updated parameters can be compressed, for example, using LZMA2 that is a variation of a Lempel-Ziv-Markov chain algorithm (LZMA), a bzip2 algorithm, or the like. In an example, compression is omitted for the one or more updated parameters. In some embodiments, the one or more updated parameters or the second subset of the one or more updated parameters can be encoded into the bitstream as the neural network update information where the neural network update information indicates the one or more replacement parameters or the second subset of the one or more replacement parameters.

After the finetuning process, in some examples, the pretrained video encoder on the encoder side can be updated or finetuned based on (i) the first subset of the one or more replacement parameters or (ii) the one or more replacement parameters. An input image (e.g., one of the one or more images used to in the finetuning process) can be encoded into the bitstream using the updated video encoder. Thus, the bitstream includes both the encoded image and the neural network update information.

If applicable, in an example, the neural network update information is decoded (e.g., decompressed) by the pretrained video decoder to obtain the one or more updated parameters or the second subset of the one or more updated parameters. In an example, the one or more replacement parameters or the second subset of the one or more replacement parameters can be obtained based on the relationship between the one or more updated parameters and the one or more replacement parameters described above. The pretrained video decoder can be finetuned and the updated video decoded can be used to decode the encoded image, as described above.

The NIC framework can include any type of neural networks and use any neural network-based image compression methods, such as a context-hyperprior encoder-decoder framework (e.g., the NIC framework shown in FIG. 9)), a scale-hyperprior encoder-decoder framework, a Gaussian Mixture Likelihoods framework and variants of the Gaussian Mixture Likelihoods framework, an RNN-based recursive compression method and variants of the RNN-based recursive compression method, and the like.

Compared with related E2E image compression methods, the content-adaptive online training methods and apparatus in the disclosure can have the following benefits. Adaptive online training mechanisms are exploited to improve the NIC coding efficiency. Use of a flexible and general framework can accommodate various types of pretrained frameworks and quality metrics. For example, certain pretrained parameters in the various types of pretrained frameworks can be replaced by using online training with images to be encoded and transmitted.

The feature training process and the parameter training process can be combined in any order. In an embodiment, the feature training process and the parameter training process are applied sequentially. For example, the parameter training process is applied to update the one or more pretrained parameters in the NIC framework and thus to update the video encoder and/or the video decoder. Subsequently, the feature training process is applied to update the initial feature representation using the updated NIC framework, the updated video encoder, and/or the updated video decoder.

In an embodiment, the feature training process and the parameter training process are applied concurrently. Thus, the one or more pretrained parameters in the NIC framework and the initial feature representation are updated in a same iterative update. The iterative update of (i) the one or more values of the one or more elements in the initial feature representation and (ii) one or more pretrained parameters in the NIC framework can be performed until the R-D loss L corresponding to the final feature representation or the number of iterations of the iterative update satisfies the pre-determined condition.

Referring to FIG. 19B, in an example, a NN (e.g., part of the main encoder network (911), the context model NN (916), and/or the entropy parameter NN (917)) configured with a first subset of the one or more pretrained parameters is updated where the NN is used to generate the coded representation based on the final feature representation. At a final iteration, the coded representation corresponding to the final feature representation can be generated based on the final feature representation by the NN updated with replacement parameter(s) that replace the first subset of the one or more pretrained parameters. The replacement parameter(s) have been updated from the first subset of the one or more pretrained parameters by the number of iterations of the iterative update.

Referring to FIG. 19C, the encoded image (e.g., (931)) can be generated from the final feature representation based on the NN updated by the replacement parameter(s).

In an example, a decoding NN (e.g., the main decoder network (915)) configured with a second subset of the one or more pretrained parameters is updated with replacement parameter(s). The replacement parameter(s) has been determined from the second subset of the one or more pretrained parameters by the number of iterations of the iterative update. Referring to FIG. 19B, at a final iteration, a reconstructed image corresponding to the final feature representation can be generated based on the coded representation of the final feature representation by the decoding NN updated with the replacement parameter(s) for the second subset of the one or more pretrained parameters in the decoding NN.

Referring to FIG. 19C, neural network update information indicating the replacement parameter(s) for the second subset of the one or more pretrained parameters can be generated. The neural network update information can be included into the coded bitstream and transmitted. Further, on a decoder side, the encoded image (931) can be decoded into a reconstructed image using the decoding NN (e.g., the main decoder network (915)) updated with the replacement parameter(s) for the second subset of the one or more pretrained parameters in the decoding NN.

The feature training process and the parameter training process described in the disclosure can also be applied when an input includes one or more blocks instead of image(s). The feature training process and the parameter training process described in the disclosure are applicable when an input image or block includes raw data or residue data.

Figure 20:
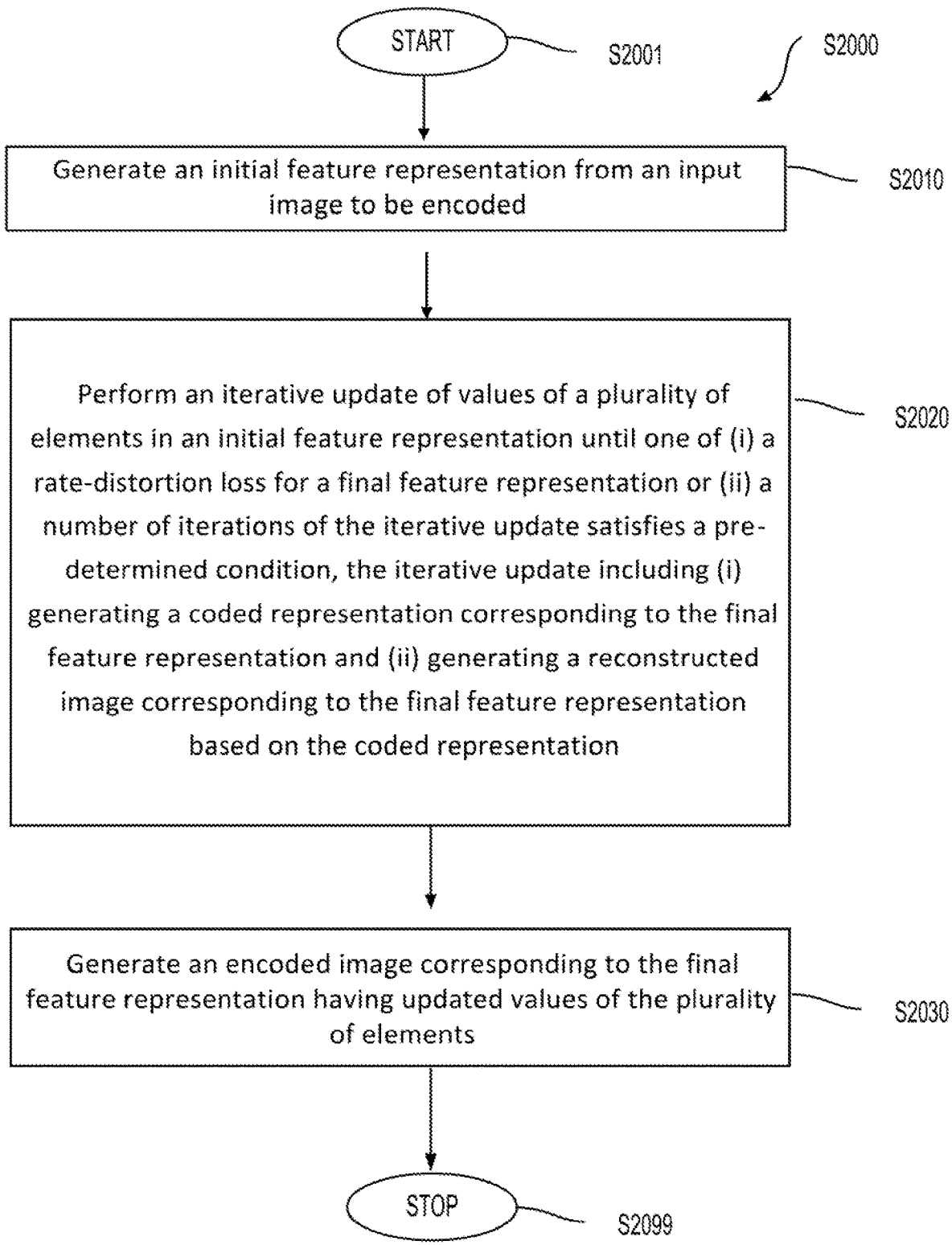
FIG. 20 shows a flow chart outlining a process according to an embodiment of the disclosure.

FIG. 20 shows a flow chart outlining a process (2000) according to an embodiment of the disclosure. The process (2000) can be used to encode an image, such as a raw image or a residue image. In various embodiments, the process (2000) is executed by processing circuitry, such as the processing circuitry in the terminal devices (310), (320), (330) and (340), the processing circuitry that performs functions of a NIC framework (e.g., the NIC framework (900), (1900B)), the processing circuitry that performs functions of the video encoder (1600A) or (1700). In an example, the processing circuitry performs a combination of functions of (i) one of the video encoder (403), (603), and (703) and (ii) one of the video encoder (1600A) and the video encoder (1700). In some embodiments, the process (2000) is implemented in software instructions, thus when the processing circuitry executes the software instructions, the processing circuitry performs the process (2000). The process starts at (S2001). In an example, an NIC framework is based on neural networks. In an example, the NIC framework is the NIC framework (900) described with reference to FIG. 9 or the framework (1900B). The NIC framework can be based on CNNs, such as described with reference to FIGS. 10-15. A video encoder (e.g., (1600A) or (1700)) can include multiple components in the NIC framework, as described above. The NIC framework based on neural networks are pretrained, and thus the video encoder is pretrained. The process (2000) proceeds to (S2010).

At (S2010), an initial feature representation can be generated from an input image to be encoded, such as described above with reference to FIG. 19B.

At (S2020), an iterative update of values of a plurality of elements in the initial feature representation can be performed until one of (i) a rate-distortion loss for a final feature representation or (ii) a number of iterations of the iterative update satisfies a pre-determined condition, as described above with reference to FIGS. 19A-19B.

The iterative update can include multiple iterations. The final feature representation has been updated from the initial feature representation by the number of iterations of the iterative update. The final feature representation can include updated values of the plurality of elements.

In a final iteration, a coded representation corresponding to the final feature representation can be generated based on the final feature representation. A reconstructed image corresponding to the final feature representation can be generated based on the coded representation corresponding to the final feature representation. The rate-distortion loss corresponding to the final feature representation can be determined based on a bit consumption (e.g., an estimated bit consumption) of the coded representation corresponding to the final feature representation and a difference between the input image and the reconstructed image corresponding to the final feature representation.

At (S2030), an encoded image corresponding to the final feature representation can be generated, such as described with reference to FIG. 19C. In an example, a coded bitstream can be generated to include the encoded image.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

This disclosure does not put any restrictions on methods used for an encoder such as a neural network based encoder, a decoder such as a neural network based decoder. Neural network(s) used in an encoder, a decoder, and/or the like can be any suitable types of neural network(s), such as a DNN, a CNN, and the like.

Thus, the content-adaptive online training methods of this disclosure can accommodate different types of NIC frameworks, e.g., different types of encoding DNNs, decoding DNNs, encoding CNNs, decoding CNNs, and/or the like.

The techniques described above, can be implemented as computer software using computer-readable instructions and physically stored in one or more computer-readable media. For example, FIG. 21 shows a computer system (2100) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 21:
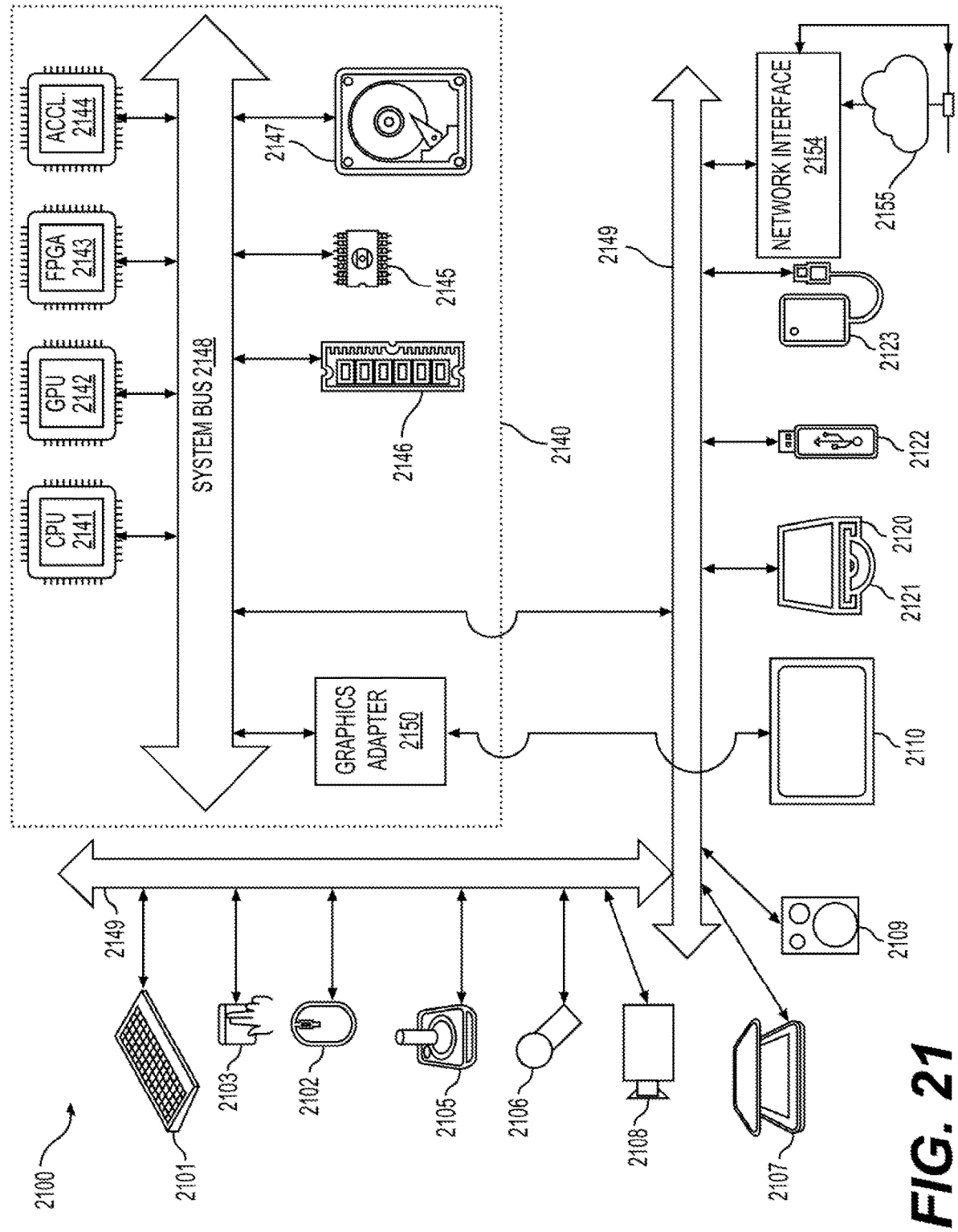
FIG. 21 is a schematic illustration of a computer system in accordance with an embodiment.

The components shown in FIG. 21 for computer system (2100) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2100).

Computer system (2100) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2101), mouse (2102), trackpad (2103), touch screen (2110), data-glove (not shown), joystick (2105), microphone (2106), scanner (2107), camera (2108).

Computer system (2100) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2110), data-glove (not shown), or joystick (2105), but there can also be tactile feedback devices that do not serve as input devices), audio output devices (such as: speakers (2109), headphones (not depicted)), visual output devices (such as screens (2110) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2100) can also include human accessible storage devices and their associated media such as optical media including CD/DVD ROM/RW (2120) with CD/DVD or the like media (2121), thumb-drive (2122), removable hard drive or solid state drive (2123), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2100) can also include an interface (2154) to one or more communication networks (2155). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2149) (such as, for example USB ports of the computer system (2100)); others are commonly integrated into the core of the computer system (2100) by attachment to a system bus as described below (for example Ethernet interface into a PC computer system or cellular network interface into a smart-phone computer system). Using any of these networks, computer system (2100) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2140) of the computer system (2100).

The core (2140) can include one or more Central Processing Units (CPU) (2141), Graphics Processing Units (GPU) (2142), specialized programmable processing units in the form of Field Programmable Gate Areas (FPGA) (2143), hardware accelerators for certain tasks (2144), graphics adapters (2150), and so forth. These devices, along with Read-only memory (ROM) (2145), Random-access memory (2146), internal mass storage such as internal non-user accessible hard drives, SSDs, and the like (2147), may be connected through a system bus (2148). In some computer systems, the system bus (2148) can be accessible in the form of one or more physical plugs to enable extensions by additional CPUs, GPU, and the like. The peripheral devices can be attached either directly to the core's system bus (2148), or through a peripheral bus (2149). In an example, the screen (2110) can be connected to the graphics adapter (2150). Architectures for a peripheral bus include PCI, USB, and the like.

CPUs (2141), GPUs (2142), FPGAs (2143), and accelerators (2144) can execute certain instructions that, in combination, can make up the aforementioned computer code. That computer code can be stored in ROM (2145) or RAM (2146). Transitional data can be also be stored in RAM (2146), whereas permanent data can be stored for example, in the internal mass storage (2147). Fast storage and retrieve to any of the memory devices can be enabled through the use of cache memory, that can be closely associated with one or more CPU (2141), GPU (2142), mass storage (2147), ROM (2145), RAM (2146), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2100), and specifically the core (2140) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2140) that are of non-transitory nature, such as core-internal mass storage (2147) or ROM (2145). The software implementing various embodiments of the present disclosure can be stored in such devices and executed by core (2140). A computer-readable medium can include one or more memory devices or chips, according to particular needs. The software can cause the core (2140) and specifically the processors therein (including CPU, GPU, FPGA, and the like) to execute particular processes or particular parts of particular processes described herein, including defining data structures stored in RAM (2146) and modifying such data structures according to the processes defined by the software. In addition or as an alternative, the computer system can provide functionality as a result of logic hardwired or otherwise embodied in a circuit (for example: accelerator (2144)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
NIC: Neural Image Compression
R-D: Rate-Distortion
E2E: End to End
ANN: Artificial Neural Network
DNN: Deep Neural Network
CNN: Convolution Neural Network While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video encoding, comprising:
generating an initial feature representation by an encoder network from an input image to be encoded;
performing an iterative update of the initial feature representation of the input image and of at least one parameter in a neural network (NN), the iterative update including
generating a first representation by adding noise to the initial feature representation of the input image,
updating the at least one parameter in the NN based on the first feature representation,
generating a coded representation by the NN based on the first feature representation of the input image,
generating a reconstructed image corresponding to the first feature representation of the input image based on the coded representation, and
updating at least one value in a row or a column of the initial feature representation based on the generated reconstructed image to generate (i) a next initial feature representation of a subsequent iteration of the iterative update or (ii) a final feature representation of the input image,
generating an encoded image corresponding to the final feature representation of the input image, wherein
one of (i) a rate-distortion loss corresponding to the final feature representation of the input image or (ii) a number of iterations of the iterative update satisfies a pre-determined condition, and
the rate-distortion loss is determined based on a bit consumption of the coded representation corresponding to the final feature representation of the input image and a difference between the input image and the reconstructed image corresponding to the final feature representation.

2. The method of claim 1, wherein
the generating the coded representation includes:
generating the coded representation based on a simulated entropy encoding of the first representation, and
the generating the reconstructed image includes a simulated entropy decoding of the coded representation.

3. The method of claim 2, wherein the generating the coded representation based on the simulated entropy encoding further comprises:
determining a context model based on the first representation, and
generating the coded representation based on the simulated entropy encoding of the first representation with the determined context model.

4. The method of claim 1, wherein
the generating the encoded image comprises quantizing the final feature representation into a quantized representation, the encoded image being generated based on the quantized representation.

5. The method of claim 4, wherein the generating the encoded image comprises:
entropy encoding the quantized representation into the encoded image.

6. The method of claim 5, wherein the entropy encoding comprises arithmetic encoding the quantized representation into the encoded image.

7. The method of claim 5, wherein the entropy encoding the quantized representation further comprises:
determining a context model based on the final feature representation, and entropy encoding, based on the determined context model, the quantized representation into the encoded image.

8. The method of claim 1, wherein
the generating the coded representation includes generating the coded representation by the NN updated with a replacement parameter corresponding to the at least one parameter updated based on the first feature representation, the replacement parameter having been determined by the number of iterations of the iterative update, and
the generating the encoded image includes generating, based on the NN updated by the replacement parameter, the encoded image from the final feature representation.

9. The method of claim 1, wherein
the generating the reconstructed image includes generating the reconstructed image based on the coded representation by the NN updated with a replacement parameter corresponding to the at least one parameter updated based on the first feature representation, the replacement parameter having been determined by the number of iterations of the iterative update, and
the method further includes
generating neural network update information that is included in a coded bitstream, the neural network update information indicating the replacement parameter, and
transmitting the encoded image and the neural network update information in the coded bitstream.

10. The method of claim 1, further comprising:
transmitting the encoded image in a coded bitstream.

11. An apparatus for video encoding, comprising:
processing circuitry configured to:
generate an initial feature representation by an encoder network from an input image to be encoded;
perform an iterative update of values of the initial feature representation of the input image and of at least one parameter in a neural network (NN), the iterative update including
generating a first representation by adding noise to the initial feature representation of the input image,
updating the at least one parameter in the NN based on the first feature representation,
generating a coded representation by the NN based on the first feature representation of the input image,
generating a reconstructed image corresponding to the first feature representation of the input image based on the coded representation, and
updating at least one value in a row or a column of the initial feature representation based on the generated reconstructed image to generate (i) a next initial feature representation of a subsequent iteration of the iterative update or (ii) a final feature representation of the input image,
generate an encoded image corresponding to the final feature representation of the input image, wherein
one of (i) a rate-distortion loss corresponding to the final feature representation of the input image or (ii) a number of iterations of the iterative update satisfies a pre-determined condition, and
the rate-distortion loss is determined based on a bit consumption of the coded representation corresponding to the final feature representation of the input image and a difference between the input image and the reconstructed image corresponding to the final feature representation.

12. The apparatus of claim 11, wherein the processing circuitry is configured to:
generate the coded representation based on a simulated entropy encoding of the first representation, and
perform a simulated entropy decoding of the coded representation.

13. The apparatus of claim 12, wherein the processing circuitry is configured to:
determine a context model based on the first representation, and
generate the coded representation based on the simulated entropy encoding of the first representation with the determined context model.

14. The apparatus of claim 11, wherein the processing circuitry is configured to:
quantize the final feature representation into a quantized representation, the encoded image being generated based on the quantized representation.

15. The apparatus of claim 14, wherein the processing circuitry is configured to:
entropy encode the quantized representation into the encoded image.

16. The apparatus of claim 15, wherein the processing circuitry is configured to arithmetic encode the quantized representation into the encoded image.

17. The apparatus of claim 15, wherein the processing circuitry is configured to:
determine a context model based on the final feature representation, and
entropy encode, based on the determined context model, the quantized representation into the encoded image.

18. The apparatus of claim 11, wherein the processing circuitry is configured to:
generate the coded representation by
generating the coded representation by the NN updated with a replacement parameter corresponding to the at least one parameter updated based on the first feature representation, the replacement parameter having been determined by the number of iterations of the iterative update, and
generate, based on the NN updated by the replacement parameter, the encoded image from the final feature representation.

19. The apparatus of claim 11, wherein the processing circuitry is configured to:
generate the reconstructed image including
generating the reconstructed image based on the coded representation by the NN updated with a replacement parameter corresponding to the at least one parameter updated based on the first feature representation of the input image, the replacement parameter having been determined by the number of iterations of the iterative update,
generate neural network update information that is included in a coded bitstream, the neural network update information indicating the replacement parameter, and
transmit the encoded image and the neural network update information in the coded bitstream.

20. A non-transitory computer-readable storage medium storing a program executable by at least one processor to perform:
generating an initial feature representation by an encoder network from an input image to be encoded;

performing an iterative update of the initial feature representation of the input image and of at least one parameter in a neural network (NN), the iterative update including
- generating a first representation by adding noise to the initial feature representation of the input image,
- updating the at least one parameter in the NN based on the first feature representation,
- generating a coded representation by the NN based on the first feature representation of the input image,
- generating a reconstructed image corresponding to the first feature representation of the input image based on the coded representation, and
- updating at least one value in a row or a column of the initial feature representation based on the generated reconstructed image to generate (i) a next initial feature representation of a subsequent iteration of the iterative update or (ii) a final feature representation of the input image, generating an encoded image corresponding to the final feature representation of the input image, wherein one of (i) a rate-distortion loss corresponding to the final feature representation of the input image or (ii) a number of iterations of the iterative update satisfies a pre-determined condition, and the rate-distortion loss is determined based on a bit consumption of the coded representation corresponding to the final feature representation of the input image and a difference between the input image and the reconstructed image corresponding to the final feature representation.

* * * * *